(12) United States Patent
Brouwers et al.

(10) Patent No.: US 11,033,165 B2
(45) Date of Patent: Jun. 15, 2021

(54) ARTIFICIAL BARRIER FOR AUTONOMOUS FLOOR CLEANER

(71) Applicant: BISSELL Inc., Grand Rapids, MI (US)

(72) Inventors: Andrew J. Brouwers, Grand Rapids, MI (US); David VanKampen, Grand Rapids, MI (US); Jeffery Swan, Ovid, MI (US); Eric D. Buehler, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

(21) Appl. No.: 16/739,583

(22) Filed: Jan. 10, 2020

(65) Prior Publication Data

US 2020/0221915 A1    Jul. 16, 2020

Related U.S. Application Data

(60) Provisional application No. 62/791,105, filed on Jan. 11, 2019.

(51) Int. Cl.
*A47L 9/28* (2006.01)

(52) U.S. Cl.
CPC .......... *A47L 9/2894* (2013.01); *A47L 9/2852* (2013.01); *A47L 2201/04* (2013.01)

(58) Field of Classification Search
CPC ........ A47L 9/28; A47L 9/2894; A47L 9/2852; A47L 2201/04; A47L 9/2842; A47L 9/2857; A47L 2201/00; A47L 9/2889; A47L 9/2805; A47L 2201/06; A47L 9/32
See application file for complete search history.

(56) References Cited

U.S. PATENT DOCUMENTS

| | | | |
|---|---|---|---|
| 4,700,427 A | 10/1987 | Knepper | |
| 5,109,566 A | 5/1992 | Kobayashi et al. | |
| 5,284,522 A | 2/1994 | Kobayashi et al. | |
| 5,341,540 A | 8/1994 | Soupert et al. | |
| 5,353,224 A | 10/1994 | Lee et al. | |
| 5,537,017 A | 7/1996 | Feiten et al. | |
| 5,548,511 A | 8/1996 | Bancroft | |
| 5,634,237 A | 6/1997 | Paranjpe | |
| 5,995,884 A * | 11/1999 | Allen | G05D 1/0225 701/24 |
| 6,300,737 B1 | 10/2001 | Bergvall et al. | |

(Continued)

FOREIGN PATENT DOCUMENTS

| | | |
|---|---|---|
| CN | 203436291 | 2/2014 |
| EP | 1331537 | 7/2003 |
| KR | 101719404 | 3/2017 |

OTHER PUBLICATIONS

European Search Report for Application No. 20151286.0, dated Jul. 20, 2021.

*Primary Examiner* — Robert J Scruggs
(74) *Attorney, Agent, or Firm* — Warner Norcross + Judd LLP

(57) ABSTRACT

A system providing a barrier for an autonomous floor cleaner includes an artificial barrier generator that radiates one or more infrared emission patterns. An autonomous floor cleaner can be configured to detect an overlapping emission pattern made of partially overlapping encoded infrared emissions. Methods for containing an autonomous floor cleaner within a user-determined boundary are disclosed.

19 Claims, 16 Drawing Sheets

(56) References Cited

U.S. PATENT DOCUMENTS

| | | | |
|---|---|---|---|
| 6,594,844 B2 * | 7/2003 | Jones | G05D 1/0238 |
| | | | 15/49.1 |
| 6,690,134 B1 * | 2/2004 | Jones | A47L 9/009 |
| | | | 318/567 |
| 8,686,679 B2 * | 4/2014 | Jones | G05D 1/0225 |
| | | | 318/567 |
| 9,223,749 B2 * | 12/2015 | Chiappetta | B60L 53/38 |
| 9,393,689 B2 * | 7/2016 | Kim | G05D 1/0225 |
| 9,764,473 B1 | 9/2017 | Afrouzi | |
| 9,883,779 B2 | 2/2018 | Kasper et al. | |
| 2005/0010330 A1 * | 1/2005 | Abramson | G05D 1/0272 |
| | | | 700/245 |
| 2007/0244610 A1 * | 10/2007 | Ozick | B25J 9/0003 |
| | | | 701/23 |
| 2011/0077774 A1 * | 3/2011 | Choi | A47L 9/2852 |
| | | | 700/253 |
| 2019/0155297 A1 * | 5/2019 | Liu | G05D 1/0225 |

\* cited by examiner

ARTIFICIAL BARRIER FOR AUTONOMOUS FLOOR CLEANER

BACKGROUND

Autonomous or robotic floor cleaners can move without the assistance of a user or operator to clean a floor surface. For example, the floor cleaner can be configured to sweep dirt (including dust, hair, and other debris) into a collection bin carried on the floor cleaner and/or to sweep dirt using a cloth which collects the dirt. The floor cleaner can move randomly about a surface while cleaning the floor surface or use a mapping/navigation system for guided navigation about the surface. Some floor cleaners are further configured to apply and extract liquid for deep cleaning carpets, rugs, and other floor surfaces.

During a cycle of operation of a robotic floor cleaner, a consumer may wish to limit the area the robotic floor cleaner is able to service. There have been many systems proposed in the prior art for limiting or otherwise defining the specific physical space in which the robot can conduct a cycle of operation. These systems are typically designed for any number of robotic applications such as autonomous or semi-autonomous manufacturing, warehouse logistics, lawn care, floor cleaning, inspection, transportation, and entertainment, etc.

As described in U.S. Pat. No. 6,690,134 (Jones et al.), an autonomous floor cleaner working in one room may unintentionally wander between rooms prior to completing a cycle of operation in a first room. One solution is to confine the robot to the first room by closing all doors and physically preventing the robot from leaving the first room. This solution may be undesirable or unworkable depending upon the needs of the consumer or the floor plan of the house being serviced.

Prior art solutions include integrated systems for navigation and orientation for the robot such that the robot either travels along a predetermined path or monitors its current location against a map stored in memory either local to the robot or remote in a connected device such as a smartphone or networked cloud device. Navigation and mapping systems can include additional hardware, such as precision sensors and significant computer memory and computational power, and typically do not adapt well to changes in the area in which the robot is working. Robotic systems requiring inputted information about the space in which the robot is working include methods and systems shown in U.S. Pat. No. 4,700,427 (Knepper), U.S. Pat. No. 5,109,566 (Kobayashi et al.), and U.S. Pat. No. 5,284,522 (Kobayashi et al.).

Other prior art references describe systems that additionally require a consumer to alter or otherwise prepare the environment in which the robotic cleaner will operate. Placement and initialization of multiple localization beacons or fiducials can be burdensome for a consumer leading to narrow adoption or general dissatisfaction with little additional benefit while taxing consumer's patience. Exemplary systems are disclosed in U.S. Pat. No. 5,341,540 (Soupert et al.), U.S. Pat. No. 5,353,224 (Lee et al.), U.S. Pat. No. 5,537,017 (Feiten et al.), U.S. Pat. No. 5,548,511 (Bancroft), and U.S. Pat. No. 5,634,237 (Paranjpe).

Another approach for confining a robot to a specified area involves providing a physical indicator that defines a boundary of the work area for the robotic cleaner. For example, U.S. Pat. No. 6,300,737 (Bergvall et al.) discloses an electronic bordering system in which a cable is placed on or under the ground to separate an inner area from an outer area. Commercially available robotic floor cleaners can be coupled with magnetic or reflective tape that a consumer can use to fashion a boundary that the robotic cleaner will not traverse.

Yet another approach for robotic confinement relates to the provision of a directed confinement beam. U.S. Pat. No. 6,690,134 (Jones et al.) discloses a portable barrier signal transmitting device that includes a primary emitter that operates to emit a confinement beam primarily along an axis to define a directed barrier.

BRIEF SUMMARY

An aspect of the present disclosure relates to a system providing a barrier for an autonomous floor cleaner. The system includes an artificial barrier generator that radiates one or more infrared emission patterns. An autonomous floor cleaner can be configured to detect an overlapping emission pattern that is made of partially overlapping encoded infrared emissions.

In one aspect, a method of containing an autonomous floor cleaner within a user-determined boundary is provided. The method can include providing an artificial barrier generator comprising a plurality of infrared transmitters, emitting a first signal from a first one of the plurality of infrared transmitters, emitting a second signal from a second one of the plurality of infrared transmitters, the second signal partially overlapping the first signal to create a barrier zone in which both the first and second signals can be detected by the autonomous floor cleaner, detecting the barrier zone with a receiver of the autonomous floor cleaner, and altering the course of the autonomous floor cleaner to avoid crossing through the barrier zone.

In another aspect, an artificial barrier generator for containing an autonomous floor cleaner within a user-determined boundary is provided. The artificial barrier generator can include a housing, a first infrared transmitter within the housing configured to emit a first signal for detection by an autonomous floor cleaner, and a second infrared transmitter within the housing configured to emit a second signal for detection by an autonomous floor cleaner. The first and second infrared transmitters partially overlap the emitted first and second signals to create a barrier zone in which both the first and second signals can be detected by an autonomous floor cleaner.

In yet another aspect, an autonomous floor cleaner for autonomously moving over a floor surface while cleaning is provided. The autonomous floor cleaner can have different user-selectable modes or settings for interaction with an artificial barrier generator. Depending on the setting, when a signal from the artificial barrier generator is detected, the autonomous floor cleaner can react generator by altering course, or can ignore the signal.

In yet another aspect, a system for providing an artificial barrier for autonomous cleaning can include at least one autonomous floor cleaner and at least one artificial barrier generator. The system can be used to limit access to an area of a floor surface, such as by containing the autonomous floor cleaner within a user-determining boundary using the artificial barrier generator, which can radiate one or more infrared emission patterns. The autonomous floor cleaner can be configured to detect an overlapping emission pattern that is made of partially overlapping encoded infrared emissions from the artificial barrier generator.

In still another aspect, an autonomous cleaning system for providing an artificial barrier for autonomous cleaning can include at least one autonomous floor cleaner and at least one artificial barrier generator. The artificial barrier generator can include a first infrared transmitter that emits a first signal and a second infrared transmitter that emits a second signal. The system can further include multiple settings, including a first keep out setting where the autonomous floor cleaner alters course upon detection of the first signal but not the second signal, a second keep out setting where the autonomous floor cleaner alters course upon detection of the second signal but not the first signal, a third keep out setting where the autonomous floor cleaner alters course upon detection of either signal, a barrier setting where the autonomous floor cleaner alters course upon detection of both signals, or any combination of these settings. The settings can be controlled at the autonomous floor cleaner or at the artificial barrier generator.

In still another aspect, a method of containing an autonomous floor cleaner within a user-determined boundary is provided, where the user-determined boundary is based on a user-selectable setting. The method can include providing an artificial barrier generator comprising a plurality of infrared transmitters, emitting a first signal from a first one of the plurality of infrared transmitters, emitting a second signal from a second one of the plurality of infrared transmitters, and detecting at least one of the first signal or second signal with a receiver of the autonomous floor cleaner. In a first keep out setting, the autonomous floor cleaner can alter course upon detection of the first signal but not the second signal. In a second keep out setting, the autonomous floor cleaner can alter course upon detection of the second signal but not the first signal. In a third keep out setting, the autonomous floor cleaner can alter course upon detection of either signal. In a barrier setting, the autonomous floor cleaner can alter course upon detection of both signals.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

The invention will now be described with respect to the drawings in which.

18 in an environment projecting the first and second keep out signals to create a third keep out zone.

DESCRIPTION OF EMBODIMENTS OF THE INVENTION

The invention relates to autonomous floor cleaners. More specifically, the invention relates to systems, devices and methods for limiting access to an area of a floor surface to an autonomous cleaner, such as by containing an autonomous cleaner within a user-determining boundary using an artificial barrier generator.

Figure 1:
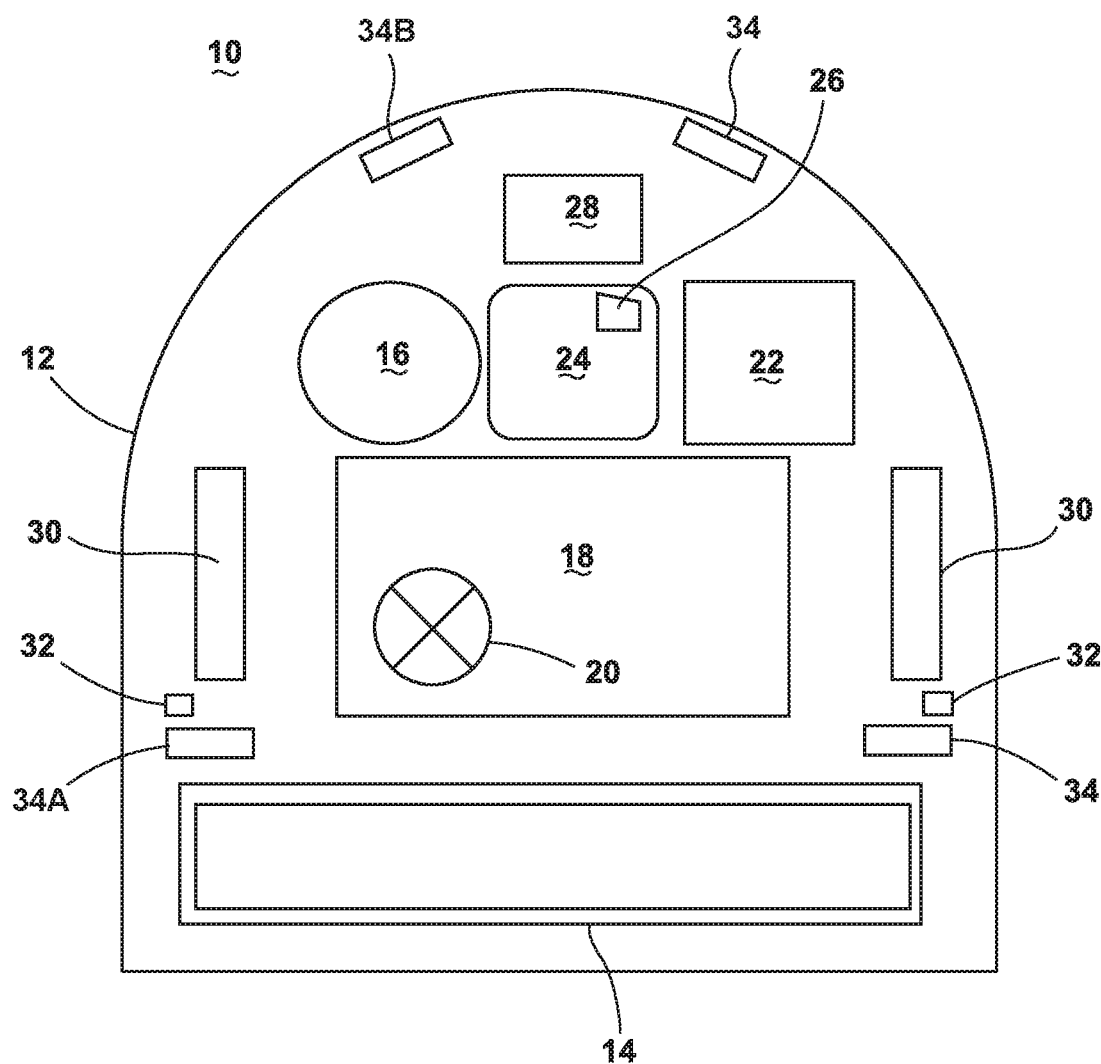
FIG. 1 is a schematic view of one embodiment of an autonomous floor cleaner.

FIG. 1 is a schematic view of an autonomous floor cleaner 10 (e.g. an autonomous vacuum cleaner, robotic cleaner, or simply robot) according to a first embodiment of the invention. The autonomous floor cleaner 10 has been illustrated as a robotic vacuum cleaner that mounts the components various functional systems of the vacuum cleaner in an autonomously moveable unit or housing 12, including components of a vacuum collection system for generating a working air flow for removing dirt (including dust, hair, and other debris) from the surface to be cleaned and storing the dirt in a collection space on the vacuum cleaner, and a drive system for autonomously moving the floor cleaner over the surface to be cleaned. While not illustrated, the autonomous floor cleaner 10 could be provided with additional functional systems, such as a navigation system for guiding the movement of the vacuum cleaner over the surface to be cleaned, a mapping system for generating and storing maps of the surface to be cleaned and recording status or other environmental variable information, and/or a dispensing system for applying a treating agent stored on the vacuum cleaner to the surface to be cleaned.

The vacuum collection system can include a working air path through the unit having an air inlet and an air outlet, a suction nozzle 14, a suction source 16 in fluid communication with the suction nozzle 14 for generating a working air stream, and a dirt bin 18 for collecting dirt from the working airstream for later disposal. The suction nozzle 14 can define the air inlet of the working air path. The suction source 16 can be a motor/fan assembly carried by the unit 12, fluidly upstream of the air outlet, and can define a portion of the working air path. The dirt bin 18 can also define a portion of the working air path, and comprise a dirt bin inlet in fluid communication with the air inlet. A separator 20 can be formed in a portion of the dirt bin 18 for separating fluid and entrained dirt from the working airstream. Some non-limiting examples of the separator include a cyclone separator, a filter screen, a foam filter, a HEPA filter, a filter bag, or combinations thereof.

The suction source 16 can be electrically coupled to a power source 22, such as a rechargeable battery. In one example, the battery can be a lithium ion battery. Charging contacts for the rechargeable battery can be provided on the exterior of the main housing. A docking station (not shown) for receiving the unit for charging can be provided with corresponding charging contacts. A user interface 24 having at least a suction power switch 26 between the suction source 16 and the power source 22 can be selectively closed by the user, thereby activating the suction source.

A controller 28 is operably coupled with the various function systems of the autonomous floor cleaner 10 for controlling its operation. The controller 28 is operably coupled with the user interface 24 for receiving inputs from a user. The controller 28 can further be operably coupled with various sensors 32, 34, 56 for receiving input about the environment and can use the sensor input to control the operation of the autonomous floor cleaner 10. Some sensors may detect features of the surrounding environment of the robot 12 including, but not limited to, walls, floors, furniture, pets, stairs, ledges, etc. Some sensors may detect an artificial barrier. The sensor input can further be stored in an on-board memory or used to develop maps by the navigation/mapping system. The sensors 32, 34, 56 are described in more detail below.

The controller 28 can be operably coupled with the drive system for directing the autonomous movement of the vacuum cleaner over the surface to be cleaned. The drive system can include drive wheels 30 for driving the unit across a surface to be cleaned. The drive wheels 30 can be operated by a common wheel motor or individual wheel motors (not shown). The drive system can receive inputs from the controller 28 for driving the robot across a floor, based on inputs from the navigation/mapping system for the autonomous mode of operation or based on inputs from a smartphone, tablet, or other remote device for an optional manual mode of operation. The drive wheels 30 can be driven in a forward or reverse direction to move the unit forwardly or rearwardly. Furthermore, the drive wheels 30 can be operated simultaneously at the same rotational speed for linear motion or independently at different rotational speeds to turn the robot in a desired direction. While the drive system is shown herein as including rotating wheels 30, it is understood that the drive system can comprise alternative traction devices for moving the robot across a surface to be cleaned.

Figure 2:
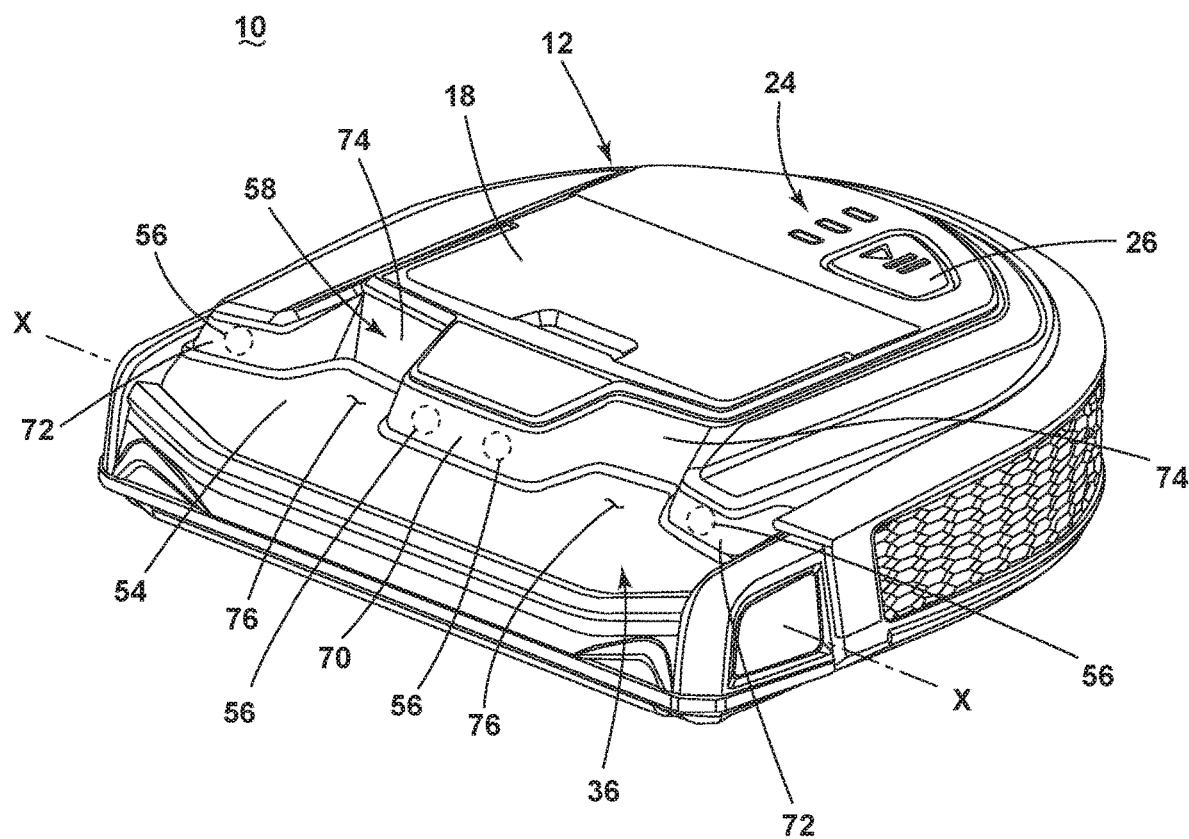
FIG. 2 is a perspective view of an embodiment of the autonomous floor cleaner of FIG. 1.
Figure 3:
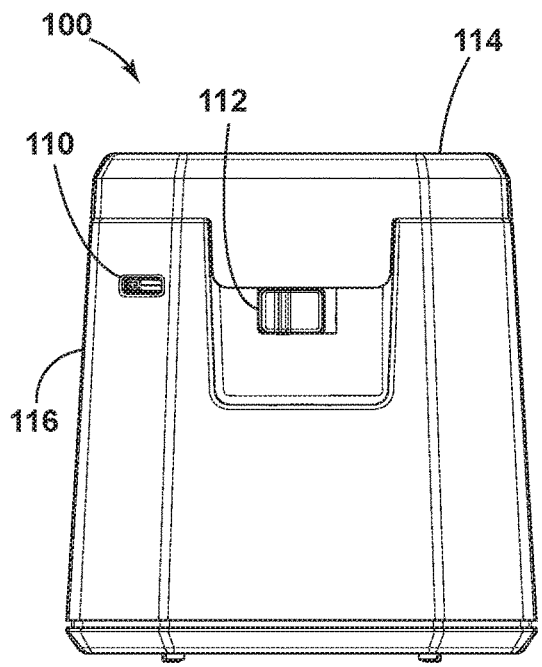
FIG. 3 is a rear view of one embodiment of an artificial barrier device.
Figure 4:
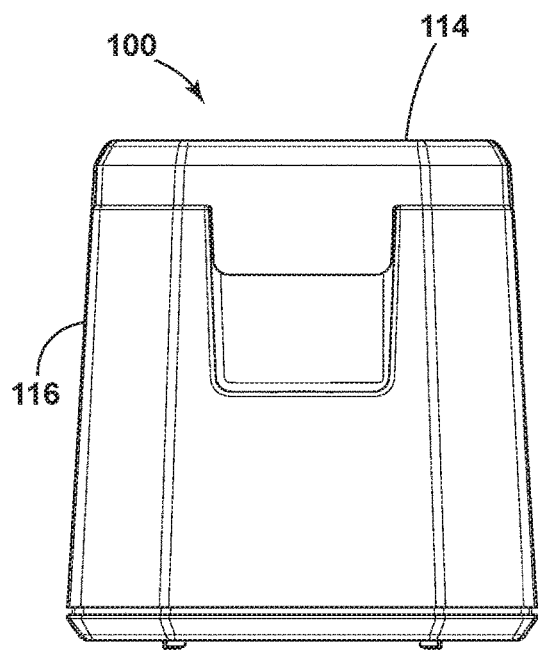
FIG. 4 is a front view of the artificial barrier device of FIG. 3.

With reference to FIG. 2, the autonomous floor cleaner 10 can include a brush chamber 36 at a front of the autonomous unit 12 in which an agitator such as a brushroll is mounted. As used herein, "front" or "forward" and variations thereof are defined relative to the direction of forward travel of the autonomous floor cleaner 10, unless otherwise specified. The brushroll is mounted for rotation about a substantially horizontal axis X, relative to the surface over which the unit 12 moves. A sole plate (not shown) can at least partially retain the brushroll in the brush chamber 36, and has an inlet opening defining the suction nozzle 14 (FIG. 1). A wiper blade (not shown) can be provided adjacent a trailing edge of the suction nozzle 14, behind the brushroll, in order to aid in dust collection. The wiper blade can be an elongated blade that generally spans the width of the suction nozzle 14, and can be supported by the sole plate.

Due to the D-shaped housing 12 and position of the brushroll at the front of the housing 12, the brushroll can be larger than brushrolls found on conventional autonomous floor cleaners. In one example, the brushroll can be a "full-size" brushroll that is typically found an upright vacuum cleaner. For example, a brushroll as described in U.S. Pat. No. 9,883,779 to Kasper et al., is suitable for use on the autonomous floor cleaner 10 shown. The brushroll can also be removable from the unit 12 for cleaning and/or replacement.

The autonomous floor cleaner 10 can include a transparent brushroll window 54 at a front of the unit 12. The brushroll window 54 defines a portion of the brush chamber 36 in which the brushroll is mounted. As such, the brushroll may be visible through the transparent portion of the window 54. The brushroll window 54 can be made from a clear or colored transparent material, such as polymethlamethacrylate.

Some exemplary sensors are illustrated in FIGS. 1-2. The autonomous floor cleaner 10 can include one or more of a wall following sensor 32, a receiver 34, and an obstacle or distance sensor 56. It is understood that not all sensors shown may be provided, additional sensors may be provided, and that all of the possible sensors can be provided in any combination. For example, other sensors, such as a cliff sensor, a bump sensor, an inertial measurement unit (IMU), a lift-up sensor, a bin sensor, or a floor condition sensor, may also be provided on the robot.

The autonomous floor cleaner 10 can include one or more wall following sensors 32 (also known as a side wall sensor) located near a side of the housing 12. The sensor 32 can be a side-facing position sensor that provides distance feedback and controls the robot so that the robot can follow near a wall without contacting the wall. The wall following sensor 32 can be an optical, mechanical, or ultrasonic sensor, including a reflective or time-of-flight sensor. In another embodiment, a wall following sensor is not provided, and the distance sensors 56 are instead used as wall following sensors.

The autonomous floor cleaner 10 can include one or more distance sensor(s) 56 for position/proximity sensing. Input from the distance sensors 56 can be used by the controller 28 to slow down and/or adjust the course of the robot when objects are detected by the distance sensors.

The sensors 56 can be mounted above the brushroll window 54, and behind a transparent or translucent portion of the housing 12. For example, the housing 12 can comprise a transparent or translucent sensor cover 58 for covering and protecting the sensors 56, while also admitting a light signal therethrough. The sensor cover 58 can be formed with indentations 74 between central and side cover portions 70, 72 that define recesses 76 that expose a larger portion of the brushroll window 54 and increase visibility of the brushroll and brush chamber 36.

The undulating sensor cover 58 allows distance sensors 56 to be positioned above the brushroll, forwardly enough so that the brushroll does not block the sensor field of view, while at the same time defining the recesses 76 adjacent to the central and side cover portions 70, 72 for maximizing visibility of the brushroll.

The autonomous floor cleaner 10 can have at least one receiver 34 to detect signals emitted from the artificial barrier generator 100. In some cases, the at least one receiver 34 is an IR receiver or IR transceiver that detects IR signals, such as encoded IR beams, emitted from the artificial barrier generator 100. Optionally, the autonomous floor cleaner 10 comprises multiple receivers 34 that can detect at least one signal, i.e. an encoded beam. In one embodiment, the receivers 34 are passive IR receivers, and can be separate from the distance sensors 56. In another embodiment, the distance sensors 56 can be infrared sensors or time-of-flight (TOF) sensors having an emitter and a receiver, and can receive signals emitted from the artificial barrier generator 100.

The receivers 34 are disposed in different locations on the housing 12 and spaced from each other so that signals from the artificial barrier generator 100 can be detected when the autonomous floor cleaner 10 is disposed at different orientations relative to the artificial barrier generator 100. For example, receivers 34 may be provided on the front, rear, and/or lateral sides of the housing 12 to receive signals transmitted from the artificial barrier generator 100.

The autonomous floor cleaner 10 can clean various floor surfaces, including bare floors such as hardwood, tile, and stone, and soft surfaces such as carpets and rugs. While illustrated as a dry vacuum cleaning robot in FIGS. 1-2, the floor cleaner 10 can alternatively be a deep cleaning robot including a fluid delivery system for storing cleaning fluid and delivering the cleaning fluid to the surface to be cleaned and a fluid recovery system for removing the cleaning fluid and debris from the surface to be cleaned and storing the recovered cleaning fluid and debris. The fluid delivery system may be configured to delivery liquid, steam, mist, or vapor to the surface to be cleaned.

In another embodiment, the autonomous floor cleaner 10 can be a wet mopping or sweeping robot including a fluid delivery system for storing cleaning fluid and delivering the cleaning fluid to the surface to be cleaned and a mopping or sweeping system for removing cleaning fluid and debris from the surface to be cleaned without the use of suction. The fluid delivery system may be configured to delivery liquid, steam, mist, or vapor to the surface to be cleaned.

In still another embodiment, the autonomous floor cleaner 10 can be a dry sweeping robot including a sweeping system for removing dry debris from the surface to be cleaned without the use of suction, and collect the removed debris in a space provided on the robot for later disposal.

Referring now to FIGS. 3-10, an artificial barrier generator 100 can be provided for containing the autonomous floor cleaner 10 within a user-determined boundary. In one embodiment, the artificial barrier generator 100 can include at least two transmitters 124, 126 for transmitting overlapping signals which create a barrier zone in which multiple signals can be detected by the autonomous floor cleaner 10. In operation, the autonomous floor cleaner 10 can alter course when the overlapping signals are detected, to avoid crossing through the barrier zone. Optionally, the artificial barrier generator 100 can include at least one receiver 102 for receiving a signal that is indicative of the autonomous floor cleaner 10 being nearby or otherwise performing a cleaning operation. In one method, the artificial barrier generator 100 can transmit and/or not transmit the overlapping signals based on input from the receiver 102. This can help conserve energy by only operating the transmitters 124, 126 when the autonomous floor cleaner 10 being nearby or is actively cleaning.

The artificial barrier generator 100 can include a housing enclosing the receiver 102 and transmitters 124, 126. As shown, the housing includes an upper housing 114 and a lower housing 116 coupled with the upper housing 114. Other configurations of the housing for the artificial barrier generator 100 are possible. The housing can be configured to stand or rest upon a floor surface to be cleaned by the autonomous floor cleaner 10.

In one embodiment, the artificial barrier generator 100 can include an upper housing 114 and a lower housing 116 with at least one sonic receiver or radio frequency receiver 102 (e.g. Wi-Fi antenna 132 and Wi-Fi chip 142) for receiving a sonic or radio frequency signal from the autonomous floor cleaner 10 and at least two infrared transmitters 124, 126 for radiating partially overlapping encoded infrared emissions 150, 160 for a predetermined period of time.

The artificial barrier generator 100 can be battery-powered by rechargeable or non-rechargeable batteries stored in a battery compartment behind a battery cover 120. The artificial barrier generator 100 can include a port such as a Universal Serial Bus (USB) port 110 to accept power from a mobile charging device such as a USB battery pack or a USB AC mains power adapter to either charge the rechargeable batteries or directly power the artificial barrier generator 100.

In one example, the receiver 102 is a sonic receiver and can comprise a microphone configured to sense a predetermined threshold sound level, which corresponds with the sound level emitted by the autonomous floor cleaner 10 when it is within a predetermined distance away from the artificial barrier generator 100.

In another example, the receiver 102 is a radio frequency receiver comprising a Wi-Fi antenna 132 and a Wi-Fi chip 142, and can detect a radio frequency signal such as a basic service set identifier (BSSID) that is broadcast by the autonomous floor cleaner 10 or by a docking station (not shown). Either of the autonomous floor cleaner 10 or the docking station (not shown) can include electronics that can be configured to act as a Wi-Fi access point (AP).

The artificial barrier generator 100 can further comprise a plurality of infrared transmitters 134-140 mounted to a printed circuit board assembly 122 and configured to radiate a plurality of short field infrared emissions 170 around the housing 114, 116 of the artificial barrier generator 100. The artificial barrier generator 100 can have any number infrared emitters arranged in any constellation useful for immersing the area around the artificial barrier generator 100 in infrared radiation, including, but not limited to, arrays of four, six, or nine infrared emitters.

The artificial barrier generator 100 can be configured to selectively radiate one or more infrared emissions for a predetermined period of time, but only after detecting a predetermined condition, such as the autonomous floor cleaner 10 being in a predetermined proximity to the generator 100 or that the autonomous floor cleaner 10 is actively performing a cleaning operation on the surface to be cleaned. For an embodiment with a sonic receiver 102, the microphone can sense the threshold sound level. For an embodiment with a radio frequency receiver 102 comprising Wi-Fi antenna 132 and Wi-Fi chip 142, the receiver 102 can sense a signal such as the BSSID, which indicates the autonomous floor cleaner 10 is nearby or active. Thus, the artificial barrier generator 100 conserves power by radiating infrared emissions only when the autonomous floor cleaner 10 is in the vicinity of the artificial barrier generator 100 or actively performing a cleaning operation on the surface to be cleaned.

As discussed above with reference to FIG. 1, the autonomous floor cleaner 10 can have at least one receiver 34 to detect signals emitted from the artificial barrier generator 100. In one embodiment, the cleaner 10 can have a plurality of infrared receivers 34 around the perimeter of the autonomous floor cleaner 10 to sense the infrared signals emitted from the artificial barrier generator 100 and output corresponding signals to the controller 28. The controller 28 can adjust drive wheel control parameters to adjust the position of the autonomous floor cleaner 10 to avoid the boundaries established by the partially overlapping encoded infrared emissions 150, 160 and the short field infrared emissions 170. In this way, the controller 28 can be configured to prevent the autonomous floor cleaner 10 from crossing an artificial barrier and/or colliding with the artificial barrier generator housing 114, 116.

The artificial barrier generator 100 can include a switch 112 by which a user can selectively turn the artificial barrier generator 100 on and off. When turned on, the artificial barrier generator 100 can activate any peripheral features useful for a cycle of operation including, but not limited to, illuminating a status light, energizing the infrared transmitters 124, 126 for generating the partially overlapping encoded infrared emissions 150, 160, energizing the infrared transmitters 134-140 for generating the short-field emissions 170, and/or polling for a Wi-Fi signal indicative of activity of the autonomous floor cleaner 10.

Generally, each infrared emission 150, 160, 170 is a coded signal. The encoding method and binary codes for each infrared emission are selected such that the autonomous floor cleaner 10 can detect the presence of each emission and distinguish between emissions, even if the autonomous floor cleaner 10 detects multiple emissions from the artificial barrier generator 100 at the same time. Other signal types and encoding methods are possible.

In one embodiment, the short-field emissions 170 can be avoidance signals, also referred to herein as keep out signals, which the autonomous floor cleaner 10 can use to navigate around and/or away from the artificial barrier generator 100. The short-field emissions 170 create a keep out zone 172 around the artificial barrier generator 100. When the autonomous floor cleaner 10 detects a keep out signal from the artificial barrier generator 100, the autonomous floor cleaner 10 can alter its course, as required, to avoid the artificial barrier generator 100, i.e. for entering further into the keep out zone 172.

The short-field emissions 170 can have a shorter range than the overlapping emissions 150, 160. The short-field emissions 170 can optionally have a wider range than the overlapping emissions 150, 160 in order to cover more area around the artificial barrier generator 100. The short-field emissions 170 can extend at least beyond the front and sides of the artificial barrier generator 100, alternatively covering up to 360 degrees around the artificial barrier generator 100.

In one embodiment, the infrared emissions 150, 160 can be long range signals, which the autonomous floor cleaner 10 can ignore or react to, as described in further detail below. The infrared emissions 150, 160 partially overlap and create an overlapping emission pattern or zone 180 where the multiple infrared emissions intersect In one embodiment, the zone 180 can be a barrier zone, with the overlapping emissions 150, 160 acting a barrier signal that the autonomous floor cleaner 10 can use to alter course to avoid crossing through the barrier zone 180. When the autonomous floor cleaner 10 detects both emissions 150, 160 from the artificial barrier generator 100, the autonomous floor cleaner 10 can alter its course, as required, to avoid crossing the barrier zone 180. Upon detecting only one of the emissions 150, 160, i.e. when the autonomous floor cleaner 10 is outside the barrier zone 180, the autonomous floor cleaner 10 can maintain its course.

The autonomous floor cleaner 10 can alter its course to avoid crossing the barrier zone 180 using any movement pattern suitable for avoidance of the barrier zone 180. In one embodiment, the autonomous floor cleaner 10 may turn around and then drive forwardly to avoid the barrier zone 180. The autonomous floor cleaner 10 can turn in a direction selected by a barrier avoidance algorithm. This determination can be based at least in part on which receiver 34 detected the signals 150, 160, which the controller 28 can use to intuit where the artificial barrier is in relation to the autonomous floor cleaner 10. For example, the autonomous floor cleaner 10 can rotate to position itself 180 degrees from where the controller 28 intuits the artificial barrier to be. This may entail rotating more or less than 180 degrees, depending on the disposition of the autonomous floor cleaner 10 relative to the barrier zone 180.

The barrier zone 180 can be defined by first and second outer edges 184, 186. The edges 184, 186 are spaced apart to define a width 188 of the barrier zone 180. The edges 184, 186 also define the overall shape of the barrier zone 180. The width 188 of the barrier zone 180 can remain substantially constant, or can increase in a direction away from the artificial barrier generator 100. The width 188 can be any width useful forming an artificial barrier including, but not limited to, around 20-25 inches.

The range and shape of the barrier zone 180 can be determined by the overlapping emissions 150, 160 from the transmitters 124, 126. The barrier zone 180 can preferably have a narrower width 188 than either of the emissions 150, 160, which can help control the shape and location of the barrier zone 180. The barrier zone 180 can extend substantially straight out from the front of the artificial barrier generator 100, with the outer edges 184, 186 being approximately orthogonal to the front of the artificial barrier generator 100. In being approximately orthogonal, the outer edges 184, 186 can deviate up to ±5 degrees from orthogonal, alternatively up to ±10 degrees from orthogonal.

In one embodiment, the barrier zone 180 has a width 188 that is less than a distance between first and second receivers 34A, 34B of the autonomous floor cleaner 10. With a wider barrier zone, the autonomous floor cleaner 10 can become stuck in the barrier zone, not knowing which way to turn to prevent crossing through the barrier zone. For the autonomous floor cleaner 10 shown in FIG. 1, the width of the barrier zone 180 can be less than the distance between first receiver 34A and second receiver 34B. Out of all receivers 34 provided on the autonomous floor cleaner 10, the first and second receivers 34A, 34B can be farthest apart from each other.

Figure 5:
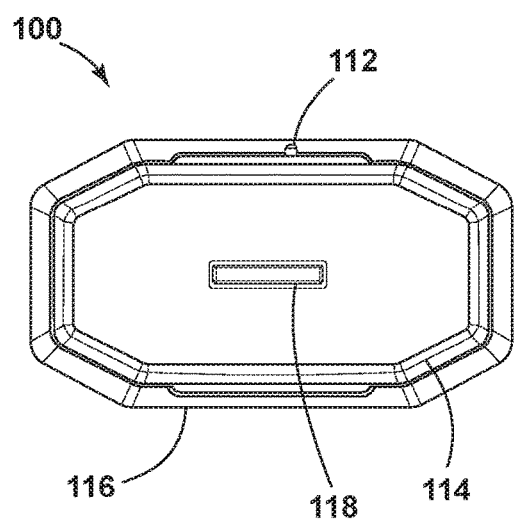
FIG. 5 is a top view of the artificial barrier device of FIG. 3.
Figure 6:
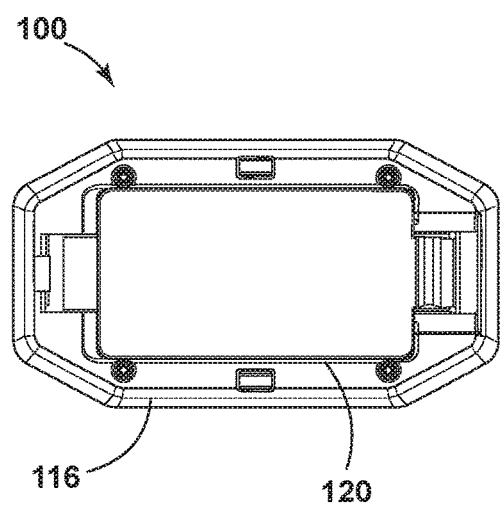
FIG. 6 is a bottom view of the artificial barrier device of FIG. 3.
Figure 7:
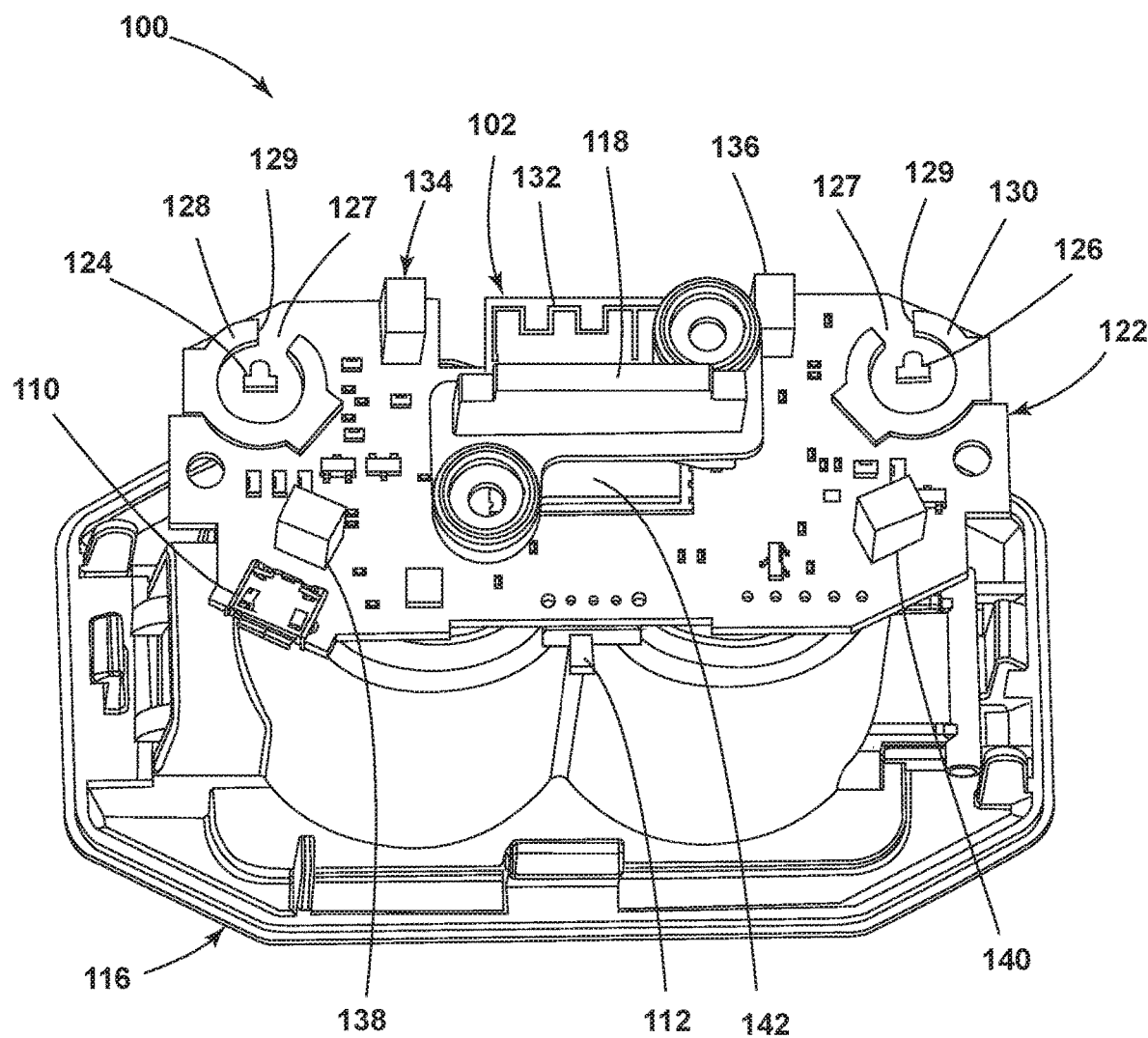
FIG. 7 is a perspective view of the artificial barrier device of FIG. 3 without an upper housing.
Figure 8:
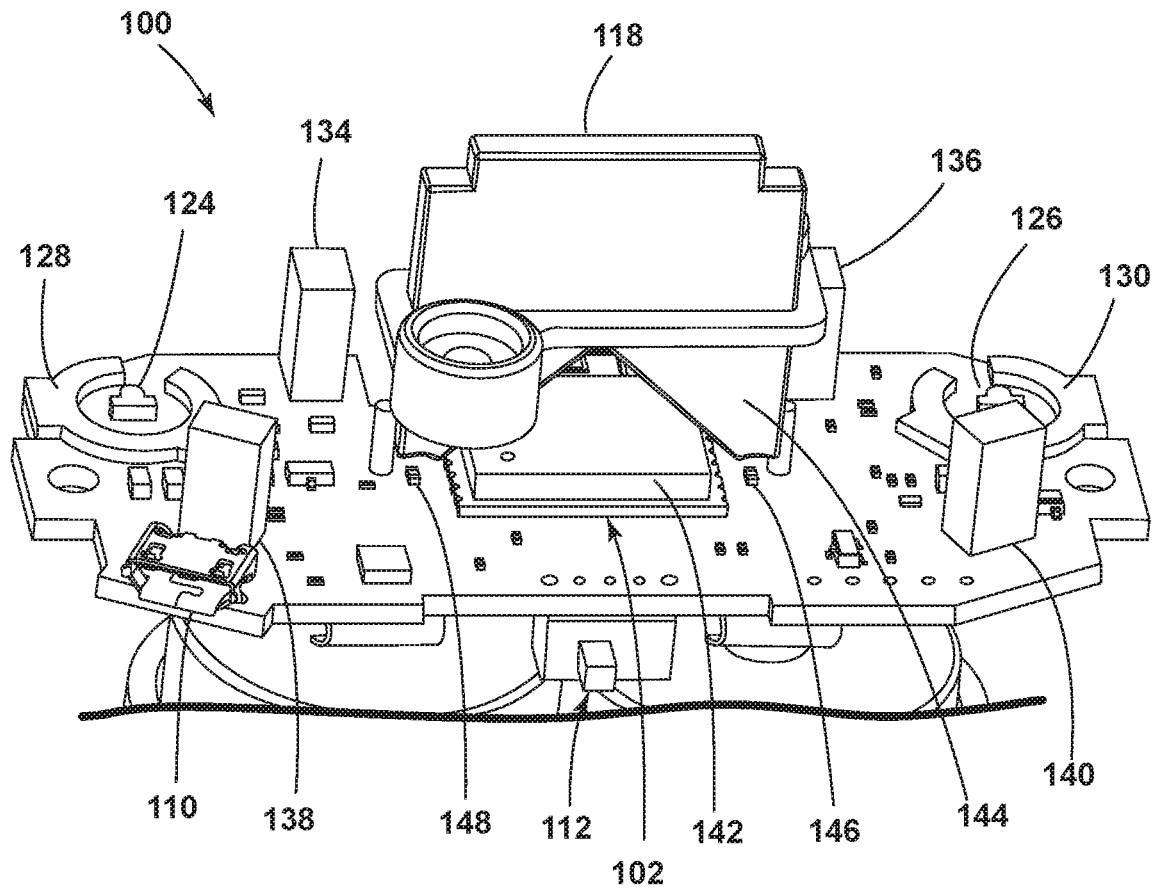
FIG. 8 is another perspective view of the artificial barrier device of FIG. 3 without the upper housing.

The artificial barrier generator 100 can illuminate one or more status lights. As shown in FIGS. 5, 7, and 8, the status light can comprise one or more status LED's 146, 148, a light pipe 144, and a lens 118, any or all of which can be mounted to the printed circuit board assembly 122. The status light can provide a visual indicator to the user that the artificial barrier generator 100 is activated.

Figure 12:
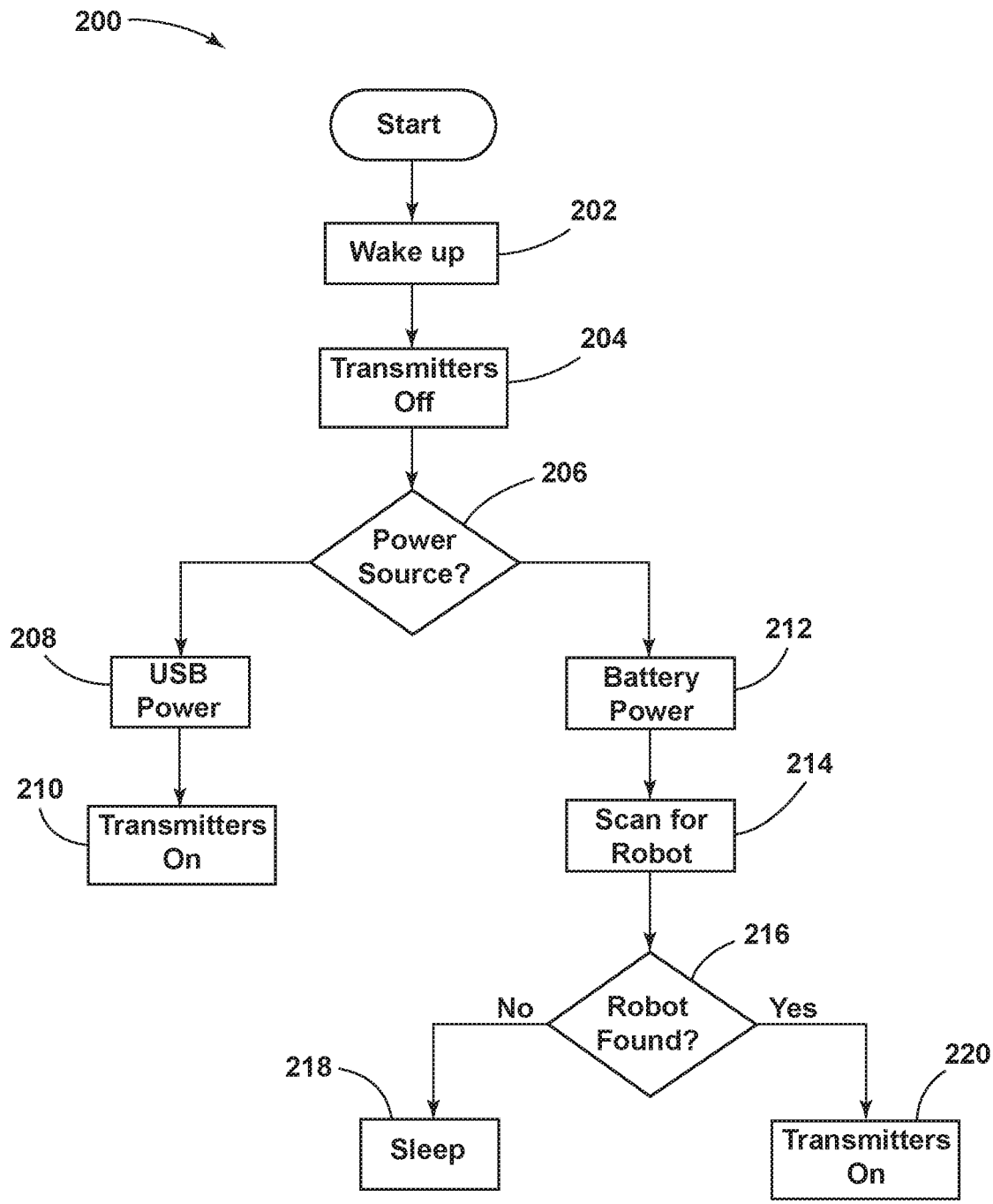
FIG. 12 is a flow chart depicting a method of operating an artificial barrier device according to one embodiment.

To poll for a Wi-Fi signal indicative of activity of the autonomous floor cleaner 10, the Wi-Fi chip 142, mounted to the printed circuit board assembly 122, can be configured to detect a radio frequency signal received at the Wi-Fi antenna 132 as described above. An ideal polling interval can be set to detect activity of the autonomous floor cleaner 10 before the autonomous floor cleaner 10 can traverse to a location near the artificial barrier generator 100 while not unnecessarily consuming stored power. For example, the polling interval can be 250 milliseconds. It is contemplated that the polling interval can be any period of time useful for detecting the activity of an autonomous floor cleaner 10 including, but not limited to, an interval ranging from 10 to 1000 milliseconds. Example flow charts depicting active and sleep modes of operation for an artificial barrier generator 100 are shown in FIGS. 12 and 13.

When a Wi-Fi signal indicative of activity of the autonomous floor cleaner 10 is not detected, the Wi-Fi chip 142 can be configured to repeat the polling process for a predetermined polling duration. For example, the artificial barrier generator 100 can be configured with a polling interval of 250 milliseconds to be repeated for a five-minute duration. If the artificial barrier generator 100 has not detected a Wi-Fi signal at the end of the predetermined polling duration, the artificial barrier generator 100 can be configured to conserve energy by entering a sleep mode that does not energize the infrared transmitters 124, 126, 134-140 for a predetermined deep sleep duration.

Figure 9:
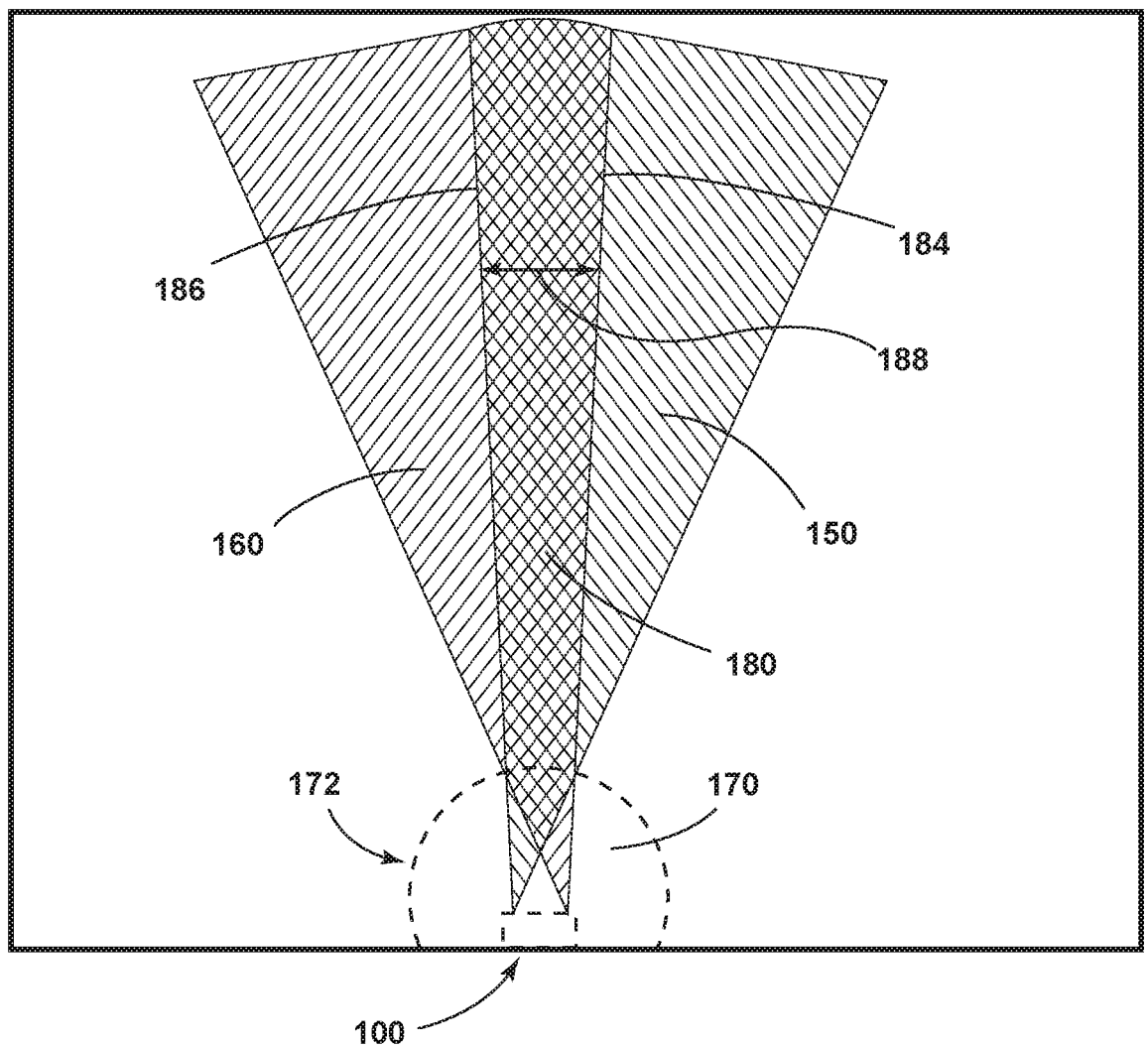
FIG. 9 is a schematic view of the artificial barrier device in an environment projecting an artificial barrier.

FIG. 9 shows one embodiment of an artificial barrier provided by the artificial barrier generator 100. The infrared transmitters 124, 126 shown in FIG. 7 can be spaced laterally and oriented to provide overlapping encoded infrared emissions shown in FIG. 9. In the embodiment shown, the first infrared transmitter 124, which can be a left-side transmitter when viewed from above as in FIG. 7, emits a first encoded infrared emission or first signal 150. The second infrared transmitter 126, which can be a right-side transmitter when viewed from above as in FIG. 7, emits a second encoded infrared emission or second signal 160. The first and second encoded infrared emissions can be configured to overlap, creating an overlapping emission pattern 180 or zone where the multiple infrared emissions intersect.

Referring now to FIG. 7 and FIG. 9, the infrared transmitters 124, 126 that emit infrared radiation that forms the partially overlapping encoded infrared emissions 150, 160 can be mounted to the printed circuit board assembly 122. The infrared transmitters 124, 126 can each be surrounded by a gasket 128, 130. The gaskets 128, 130 can be attached to the printed circuit board assembly 122.

The gaskets 128, 130 can be semi-circular rings defining apertures 127 configured to direct the emissions of the infrared transmitters 124, 126. The arc length of each aperture 127 can be configured to set a beam width of the partially overlapping encoded infrared emissions 150, 160. The arc length can be set to any value useful forming an artificial barrier including, but not limited to, a range from 30 to 45 degrees. In one implementation, the outer edges 129 of each of the apertures 127 are in axial alignment with the center of the infrared transmitters 124, 126. In this way, the overlapping emission pattern 180 of the partially overlapping encoded infrared emissions 150, 160 is defined by the outer edges 129 of each aperture 127 and can form an artificial barrier detectable by an autonomous floor cleaner 10 at a range of 16 to 20 feet with a width 188 of approximately one foot or less depending upon the implementation.

During a cycle of operation, an autonomous floor cleaner 10 can traverse the overlapping emission pattern 180 of the partially overlapping encoded infrared emissions 150, 160. Each infrared transmitter 124, 126 can broadcast an encoded modulated signal referred to hereinafter and shown in FIGS. 10 and 11 as signal 1 (from transmitter 126) and signal 2 (from transmitter 124).

Figure 10:
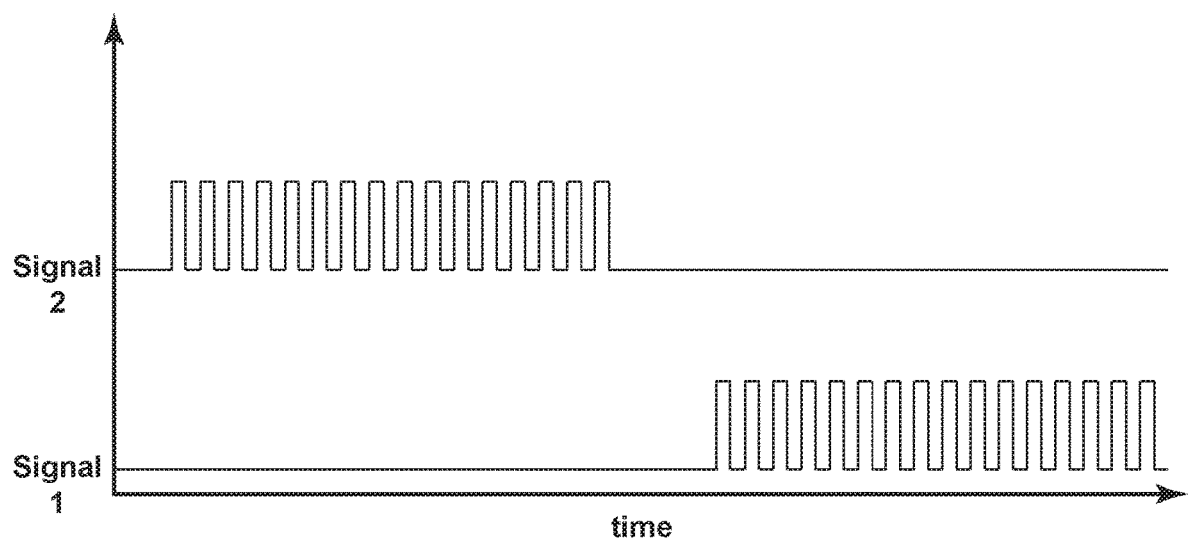
FIG. 10 is a plot depicting one modulation scheme for projecting an artificial barrier.

Referring now to FIG. 10, in one embodiment, the artificial barrier generator 100 can be configured to transmit the infrared signals 1 and 2 sequentially, and the autonomous floor cleaner 10 can be configured to receive both signals fully and react to them independently. That is, the autonomous floor cleaner 10 can receive signal 1 and then signal 2, and then determine that the autonomous floor cleaner 10 is in the overlapping emission pattern 180 indicative of an artificial barrier.

Figure 11:
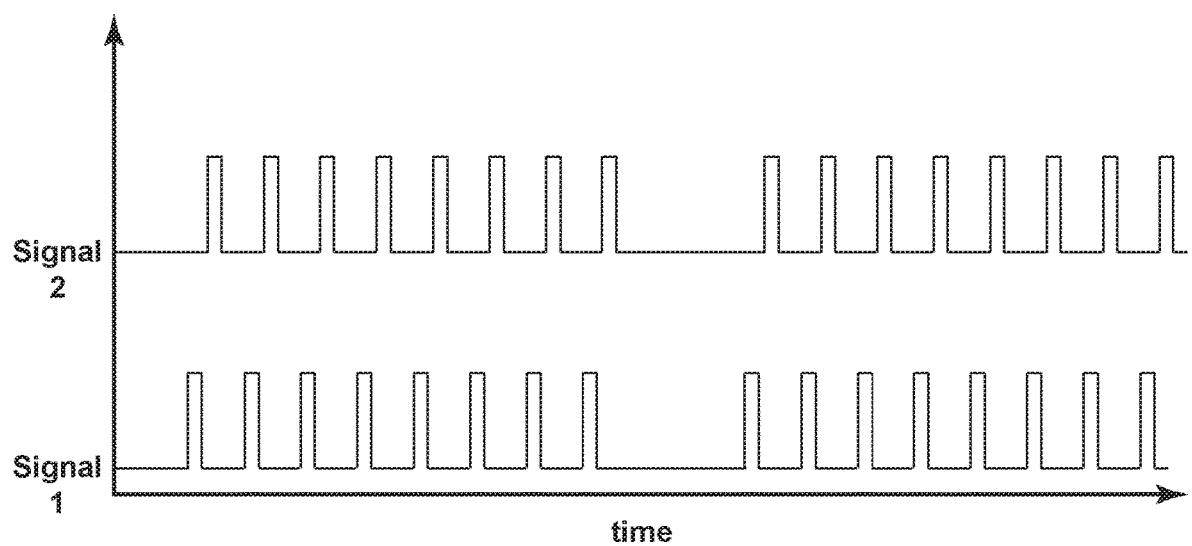
FIG. 11 is a plot depicting another modulation scheme for projecting an artificial barrier.

Alternatively, as shown in FIG. 11, the artificial barrier generator 100 can be configured to transmit signals 1 and 2 simultaneously, but temporally alternating the bits of a single code. For example, the second infrared transmitter 126 can be configured to transmit bits 0, 2, 4, 6, 8, 10, 12, 14, while the first infrared transmitter 124 can be configured to transmit bits 1, 3, 5, 7, 9, 11, 13, 15 of an NEC IR 16-bit code. In this configuration, the time required to transmit codes is halved from the independent codes transmitted such as shown in FIG. 10 consequently reducing the number of codes the autonomous floor cleaner 10 will have to process.

In one embodiment, the artificial barrier generator 100 is configured to operate in a wake mode and in a sleep mode. During the wake mode, the artificial barrier generator 100 can emit signals from the infrared transmitters 124, 126, 134-140 and generate the encoded infrared emissions 150, 160, short-field emissions 170, and overlapping emission pattern 180. The artificial barrier generator 100 is configured to enter the sleep mode in which the infrared transmitters 124, 126, 134-140 are not energized and no signals are emitted. After detecting a predetermined "wake-up" condition, such as the autonomous floor cleaner 10 being in a predetermined proximity to the generator 100 or that the autonomous floor cleaner 10 is actively performing a cleaning operation on the surface to be cleaned, the generator 100 can switch from the sleep mode back to the wake mode and resume emitting signals. In such embodiments, the artificial barrier generator 100 may further be configured to revert back to the sleep mode once the predetermined "wake-up" condition is no longer detected, or after a predetermined period of wake time.

FIG. 12 is a flow chart showing one embodiment of a method 200 for operating an artificial barrier generator 100. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

At step 202, the artificial barrier generator 100 can wake up, i.e. enter a wake mode. The artificial barrier generator 100 can enter the wake mode upon the switch 112 being turned on, or after being in a sleep mode for a predetermined time. Other possible wake-up conditions include a reboot, fault, or changing the battery of the artificial barrier generator 100.

At step 204, after waking up, one or more of the transmitters of the artificial barrier generator 100 can initially be off, i.e. inactive or deactivated, which can conserve power in case the autonomous floor cleaner 10 is not cleaning or is not nearby, and would not receive any transmitted signals.

At step 206, the power source for the artificial barrier generator 100 can be determined, e.g. whether the artificial barrier generator 100 is currently being powered via the USB port 110 or via the battery (not shown).

At step 208, if the artificial barrier generator 100 is being powered via the USB port 110, the method can proceed to step 210, and one or more of the transmitters of the artificial barrier generator 100 can be activated. In one embodiment transmitters 124, 126, and 134-140 are powered to transmit the long and short range signals 150, 160, 170.

At step 212, if the artificial barrier generator 100 is being powered via the battery, the method can proceed to step 214, and the artificial barrier generator 100 can scan for the autonomous floor cleaner 10.

In one embodiment, the artificial barrier generator 100 can search for a predetermined threshold sound level, using the sonic receiver 102, which corresponds to a sound level emitted by the autonomous floor cleaner 10 when it is within a predetermined distance away from the artificial barrier generator 100. Detection of the threshold sound level by the artificial barrier generator 100 indicates the autonomous floor cleaner 10 is nearby and/or actively cleaning.

In another embodiment, the artificial barrier generator 100 can search for a radio frequency signal, such as a basic service set identifier (BSSID), which is broadcast by the autonomous floor cleaner 10, using the radio frequency receiver 102. Detection of the radio frequency signal by the artificial barrier generator 100 indicates the autonomous floor cleaner 10 is nearby and/or actively cleaning. The autonomous floor cleaner 10 can be configured to only broadcast the radio frequency signal or BSSID while actively cleaning.

At step 216, it is determined, based on the scan, whether the autonomous floor cleaner 10 has been found. If the autonomous floor cleaner 10 is not found at step 216, then the artificial barrier generator 100 can enter a sleep mode at step 218. In the sleep mode, the infrared transmitters 124, 126, 134-140 are not activated, i.e. are deactivated to stop transmitting signals. The sleep mode can optionally last for a predetermined deep sleep duration, after which the artificial barrier generator 100 can wake up, such as be returning to step 202 of the method 200.

If the autonomous floor cleaner 10 is found at step 216, then the artificial barrier generator 100 can remain awake, and activate one or more of the transmitters of the artificial barrier generator 100 to emit at least one signal at step 220. In one embodiment transmitters 124, 126, and 134-140 are powered to transmit the long and short range signals 150, 160, 170. The wake mode can optionally last for a predetermined duration, after which the artificial barrier generator 100 can scan again for the autonomous floor cleaner 10 (e.g. return to step 216).

Figure 13A:
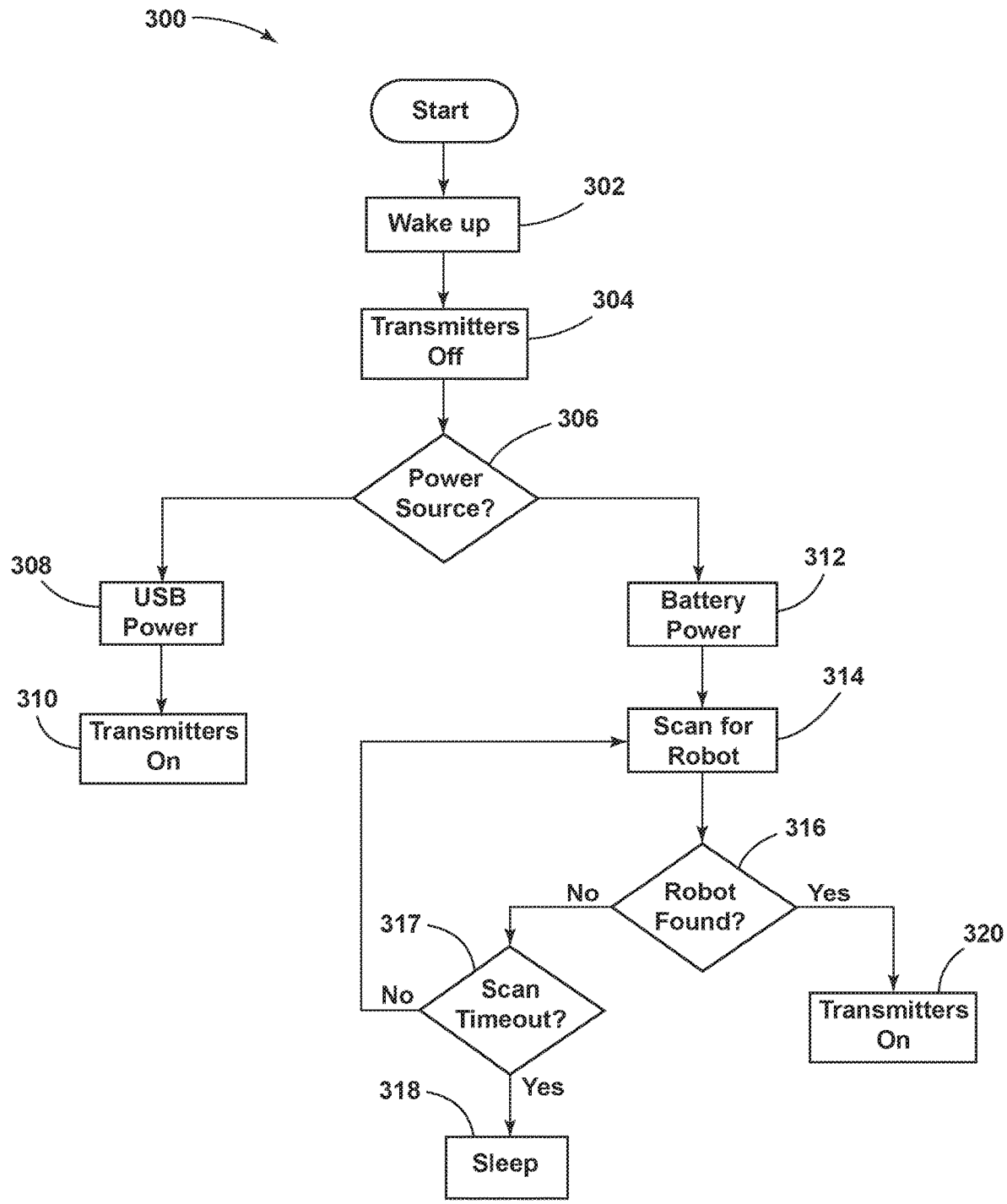
FIG. 13A is another flow chart depicting a method of operating an artificial barrier device according to another embodiment.

FIG. 13A is a flow chart showing another embodiment of a method 300 for operating an artificial barrier generator 100. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

The method 300 may proceed substantially as described previously for the first method 200, with steps 302-320 being similar or identical to steps 202-220 of the first method 200. However, rather than going directly to sleep if the autonomous floor cleaner 10 is not found at step 316, the method 300 proceeds to step 317 where the artificial barrier generator 100 determines whether a predetermined period of time, also referred to herein as a scan time threshold, has passed. In one embodiment, the scan time can be 5 minutes. As part of the scanning step 314, the artificial barrier generator 100 can start a scan timer to track the scan time.

If, at step 317, the scan time is within the predetermined scan time threshold, the method returns to step 314 and scans again for the autonomous floor cleaner 10. If the threshold is met or exceeded (i.e. a scan timeout), the method proceeds to step 318 and the artificial barrier generator 100 can stop scanning and enter the sleep mode.

Figure 13B:
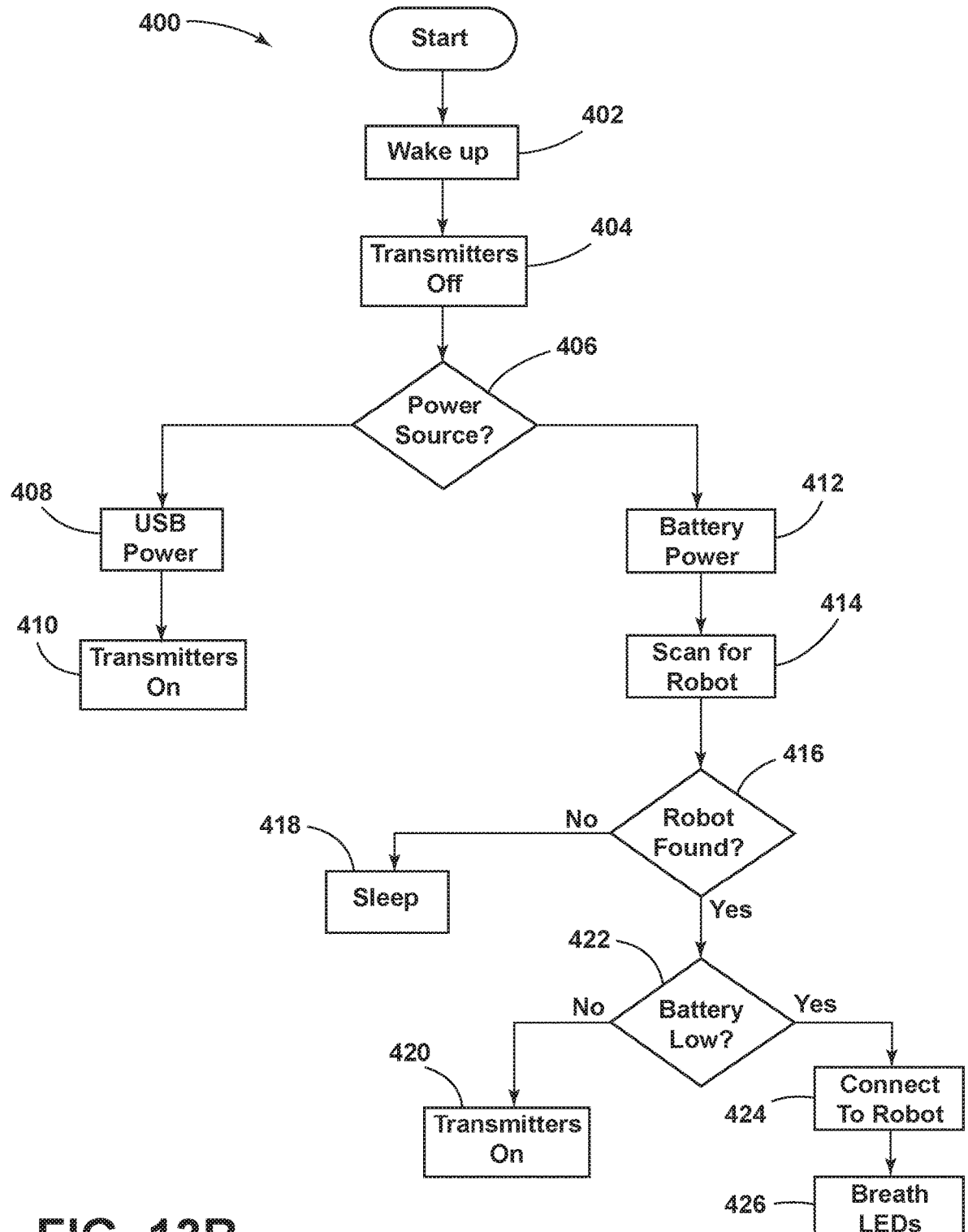
FIG. 13B is another flow chart depicting a method of operating an artificial barrier device according to yet another embodiment.

FIG. 13B is a flow chart showing yet another embodiment of a method 400 for operating an artificial barrier generator 100. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

The method 400 may proceed substantially as described previously for the first method 200, with steps 402-420 being similar or identical to steps 202-220 of the first method 200. However, rather than going directly to step 420 and turning on the transmitters if the autonomous floor cleaner 10 is found at step 416, the method 400 proceeds to step 422 where the artificial barrier generator 100 determines if the battery is below a predetermined level, e.g. whether a residual power level of the battery is below a threshold value. For example, the artificial barrier generator 100 may monitor the voltage of the battery, and determine if a voltage of the battery is less than a predetermined voltage.

If the battery is not low, the method 400 proceeds to step 420 and the artificial barrier generator 100 can activate one or more of the transmitters of the artificial barrier generator 100 to emit at least one signal, as previously described.

If the battery is low, the method 400 proceeds to step 424 and/or to step 426 in which the artificial barrier generator 100 can convey the low battery status. For example, at step 424 the artificial barrier generator 100 can communicate to the autonomous floor cleaner 10 that its battery is low. In one embodiment, the artificial barrier generator 100 can connect to the autonomous floor cleaner 10 to communicate to the autonomous floor cleaner 10 that its battery is low, and the autonomous floor cleaner 10 can then convey this information to a user or to a smartphone, tablet, or other remote device. The artificial barrier generator 100 may only connect once and then terminate connection, to conserve the remaining battery power.

At step 426, the artificial barrier generator 100 can communicate to the user that its battery is low by illuminating the LEDs 146, 148 or other status light. In one embodiment, the LEDs 146, 148 can turn on and off in a slow, breath-like pattern to convey the low battery status.

A system for providing a barrier for an autonomous floor cleaner, e.g. an artificial barrier floor cleaning system, can include at least one autonomous floor cleaner 10 and at least one artificial barrier generator 100. It is noted that the embodiment of the autonomous floor cleaner 10 described with respect to FIGS. 1-2 is but one example of an autonomous floor cleaner for the system, and that can perform the methods described herein, and that other autonomous floor cleaners can be used with the system. Likewise, it is noted that the embodiments of the artificial barrier generator 100 described with respect to FIGS. 3-13B are but some examples of an artificial barrier generator for the system, and that can perform the methods described herein, and that other artificial barrier generators can be used with the system. The system can be used to limit access to an area of a floor surface, such as by containing the autonomous floor cleaner 10 within a user-determining boundary using the artificial barrier generator 100, which can radiate one or more infrared emission patterns. The autonomous floor cleaner 10 can be configured to detect an overlapping emission pattern that is made of partially overlapping encoded infrared emissions. The system can include multiple floor cleaners 10 and/or multiple artificial barrier generators 100. Employing multiple artificial barrier generators 100 may be useful, for example, for keeping the autonomous floor cleaner 10 out of a desired area by setting up the artificial barrier generators 100 to box in the desired area.

FIGS. 14-17 illustrate another embodiment of the system, and some corresponding methods of containing the autonomous floor cleaner 10 within a user-determined boundary. In this embodiment, the autonomous floor cleaner 10 can comprise different user-selectable modes or settings for interaction with the artificial barrier generator 100. Depending on the setting, the floor cleaner 10 can react differently to detecting the various signals 150, 160, 170, 180 from the artificial barrier generator 100.

In one embodiment, the autonomous floor cleaner 10 can have a barrier setting, a first keep out setting, a second keep out setting, a third keep out setting, or any combination thereof. A user can select one of the settings via the user interface 24 (FIG. 2). In another embodiment, a user can select one of the settings via a smartphone, tablet, or other remote device.

Figure 14:
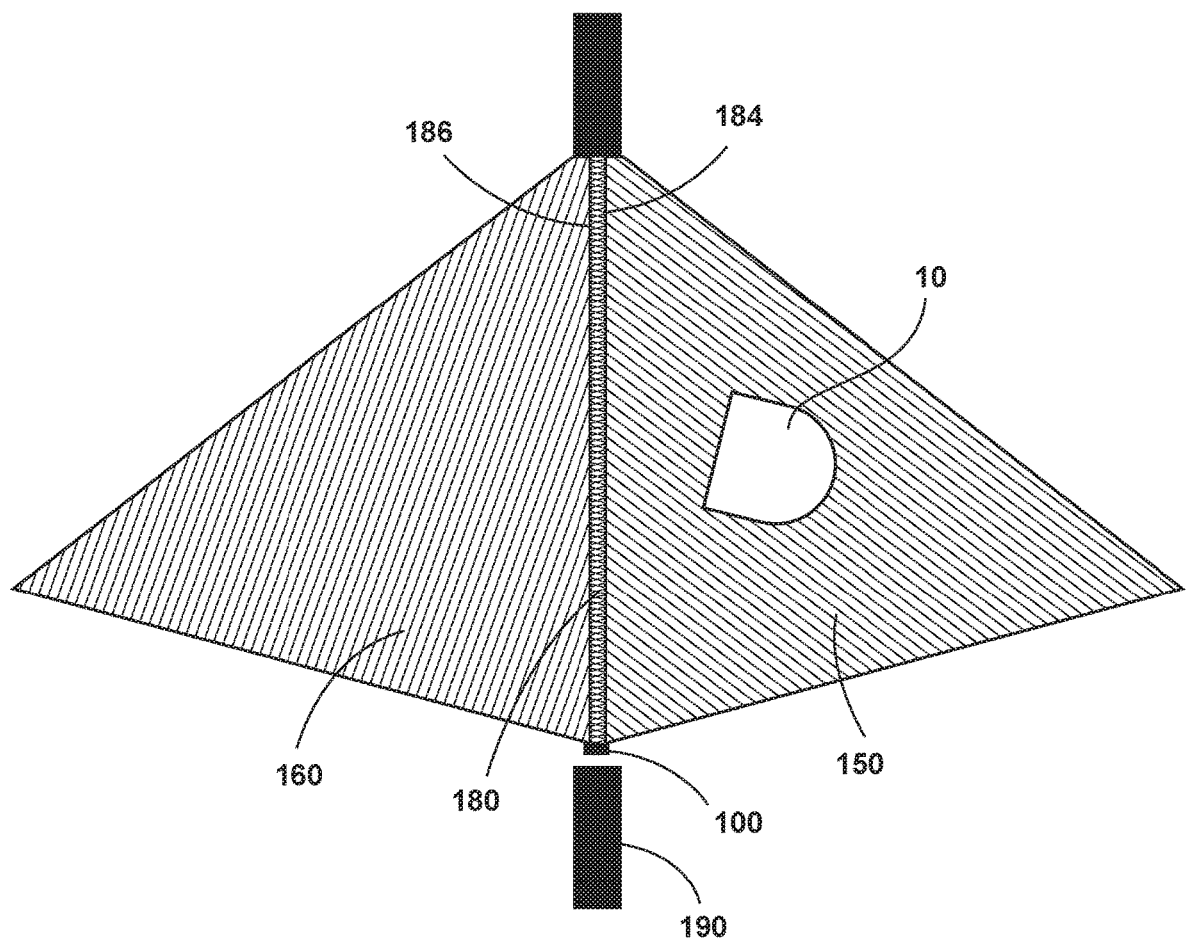
FIG. 14 is a schematic view depicting a method of containing an autonomous floor cleaner within a user-determined boundary, showing the artificial barrier device in an environment projecting an artificial barrier.

FIG. 14 shows one embodiment of a method of containing the autonomous floor cleaner 10 within a user-determined boundary, where the autonomous floor cleaner 10 is in the barrier setting. In one embodiment, in the barrier setting, the autonomous floor cleaner 10 will alter its course upon traversing the overlapping emission pattern 180. In the barrier setting, the autonomous floor cleaner 10 can ignore, i.e. not alter its course, upon detection of only the first signal 150 or only the second signal 160.

In FIG. 14, the artificial barrier generator 100 is positioned in a doorframe 190, and the overlapping emission pattern or barrier zone 180 creates a virtual partition at the doorframe 190 that the autonomous floor cleaner 10 will not cross. Thus, the barrier setting may be useful for keeping the autonomous floor cleaner 10 from going through the doorframe 190 or from entering a room.

In another embodiment (not shown), multiple artificial barrier generators 100 can be deployed to create an enclosed boundary, with the autonomous floor cleaner 10 either kept within the enclosed boundary or prevented from entering the enclosed boundary. This may be useful, for example, for keeping the autonomous floor cleaner 10 off a rug by setting up four artificial barrier generators 100 and boxing in the rug with the zones 180.

Figure 15:
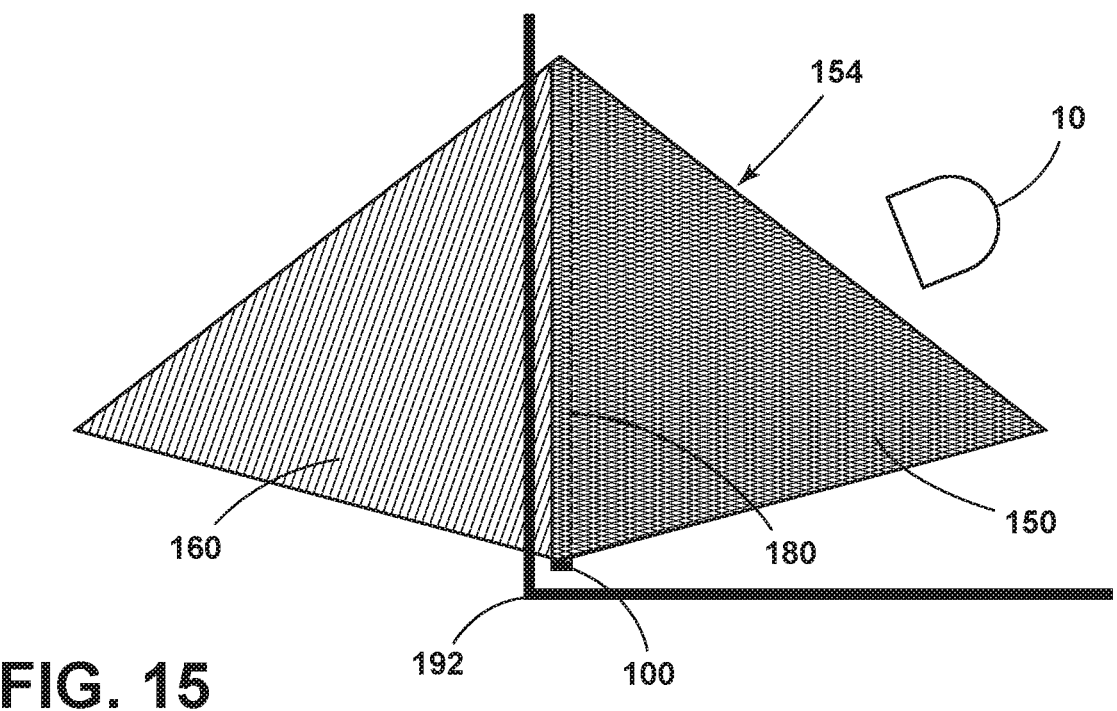
FIG. 15 is a schematic view depicting a method of containing an autonomous floor cleaner within a user-determined boundary, showing the artificial barrier device in an environment projecting a first keep out signal to create a first keep out zone.

FIG. 15 shows one embodiment of a method of containing the autonomous floor cleaner 10 within a user-determined boundary, where the autonomous floor cleaner 10 is in the first keep out setting. In one embodiment, in the first keep out setting, the autonomous floor cleaner 10 will alter its course upon detection of the first signal 150. The autonomous floor cleaner 10 can treat the first signal 150 as a keep out signal, and the encoded infrared emission 150 effectively creates a first keep out zone 154. When the autonomous floor cleaner 10 detects the first signal 150 from the artificial barrier generator 100, the autonomous floor cleaner 10 can alter its course, as required, to avoid entering further into the keep out zone 154. In the first keep out setting, the autonomous floor cleaner 10 can ignore, i.e. not alter its course, upon detection of only the second signal 160.

In the first keep out setting, the autonomous floor cleaner 10 can optionally alter its course upon detection of the overlapping emission pattern 180, in addition to the first signal 150. The keep out zone 154 can therefore encompass the first encoded infrared emission 150 and the area where the encoded infrared emissions 150, 160 overlap, i.e. the barrier zone 180.

In the embodiment shown, where the first signal is 150 directed outwardly and to the left of the artificial barrier generator 100, the first keep out setting and first keep out zone 154 can be referred to as a left keep out setting and left keep out zone 154, respectively.

In FIG. 15, the artificial barrier generator 100 is positioned in a corner 192 of a room, and the keep out zone 154 can cover the majority of the corner 192. Thus, the first keep out setting may be useful for keeping the autonomous floor cleaner 10 from going into a corner of a room, or any other area of a room that contains dog bowls, breakable items on tables, or other items to be avoided.

Figure 16:
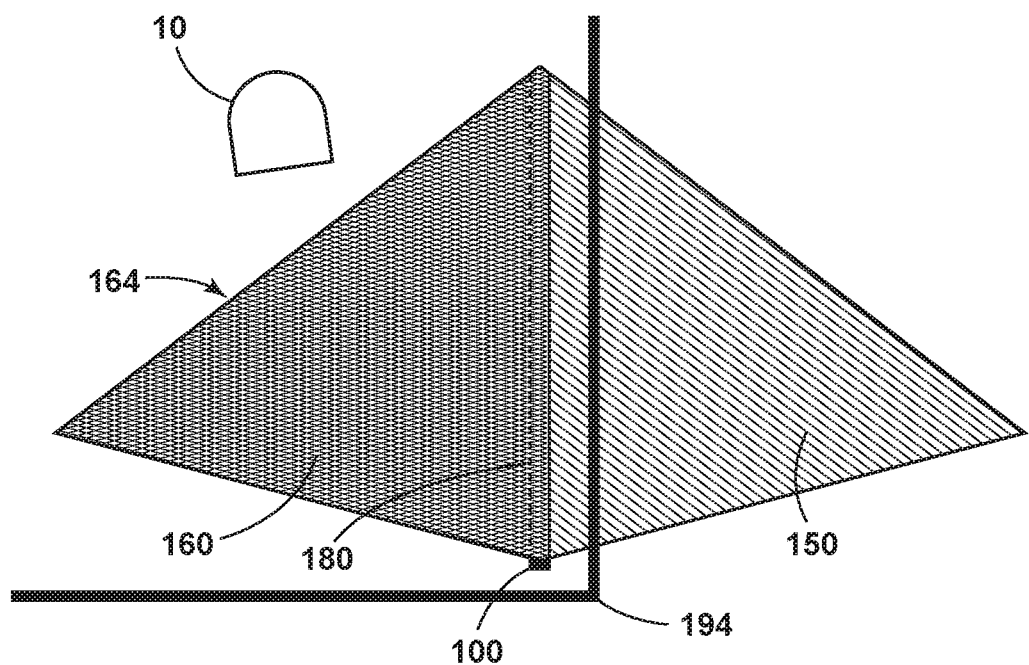
FIG. 16 is a schematic view depicting a method of containing an autonomous floor cleaner within a user-determined boundary, showing the artificial barrier device in an environment projecting a second keep out signal to create a second keep out zone.

FIG. 16 shows one embodiment of a method of containing the autonomous floor cleaner 10 within a user-determined boundary, where the autonomous floor cleaner 10 is in the second keep out setting. In one embodiment, in the second keep out setting, the autonomous floor cleaner 10 will alter its course upon detection of the second signal 160. The autonomous floor cleaner 10 can treat the second signal 160 as a keep out signal, and the encoded infrared emission 160 effectively creates a second keep out zone 164. When the autonomous floor cleaner 10 detects the second signal 160 from the artificial barrier generator 100, the autonomous floor cleaner 10 can alter its course, as required, to avoid entering further into the keep out zone 164. In the second keep out setting, the autonomous floor cleaner 10 can ignore, i.e. not alter its course, upon detection of only the first signal 150.

In the second keep out setting, the autonomous floor cleaner 10 can optionally alter its course upon detection of the overlapping emission pattern 180, in addition to the second signal 160. The keep out zone 164 can therefore encompass the second encoded infrared emission 160 and the area where the encoded infrared emissions 150, 160 overlap, i.e. the barrier zone 180.

In the embodiment shown, where the second signal 160 is directed outwardly and to the right of the artificial barrier generator 100, the second keep out setting and second keep out zone 164 can be referred to as a right keep out setting and right keep out zone 164, respectively.

In FIG. 16, the artificial barrier generator 100 is positioned in a corner 194 of a room, and the keep out zone 164 can cover the majority of the corner 194. Thus, the second keep out setting may be useful for keeping the autonomous floor cleaner 10 from going into a corner of a room, or any other area of a room that contains dog bowls, breakable items on tables, or other items to be avoided.

Figure 17:
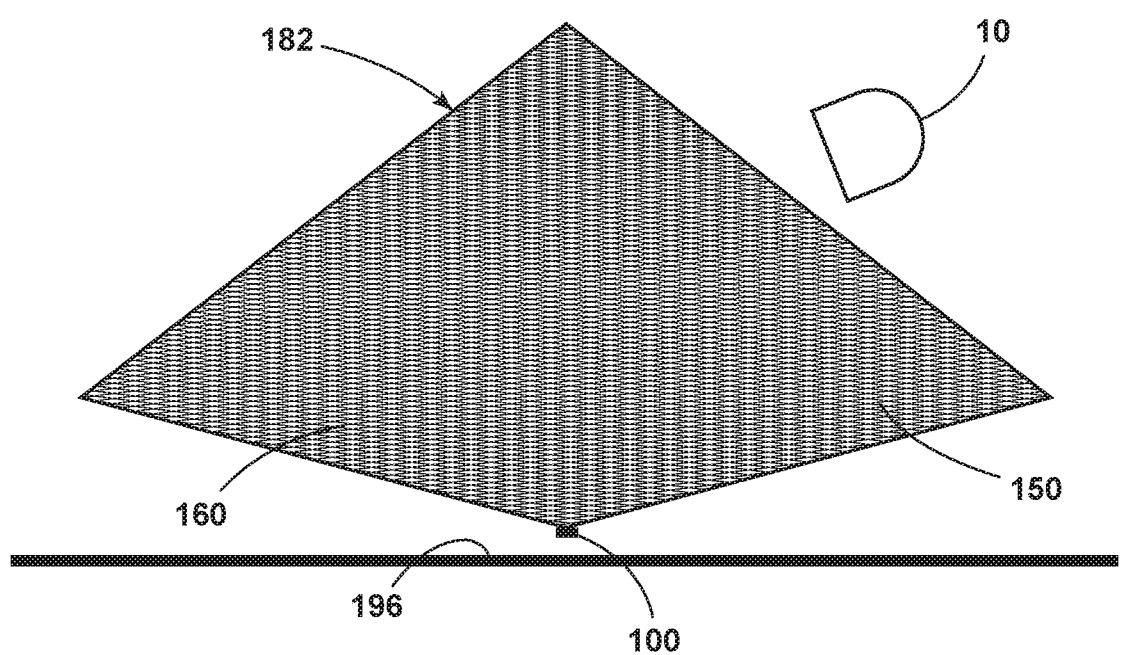
FIG. 17 is a schematic view depicting a method of containing an autonomous floor cleaner within a user-determined boundary, showing the artificial barrier device in an environment projecting the first and second keep out signals to create a third keep out zone.

FIG. 17 shows one embodiment of a method of containing the autonomous floor cleaner 10 within a user-determined boundary, where the autonomous floor cleaner 10 is in the third keep out setting. In one embodiment, in the third keep out setting, also referred to herein as an all keep out setting, the autonomous floor cleaner 10 will alter its course upon detection of either the first or second signal 150, 160. The autonomous floor cleaner 10 can treat the both signals 150, 160 as a keep out signal, and the encoded infrared emissions effectively create a third keep out zone 182. When the autonomous floor cleaner 10 detects the either signal 150, 160 from the artificial barrier generator 100, the autonomous floor cleaner 10 can alter its course, as required, to avoid entering further into the keep out zone 182.

In the embodiment shown, where the first signal is 150 directed outwardly and to the left of the artificial barrier generator 100 and where the second signal 160 is directed outwardly and to the right of the artificial barrier generator 100, the keep out zone 182 can cover a wide area in front of the artificial barrier generator 100.

The keep out zone 182 may partially overlap the keep out zone 172 (FIG. 9) created by the short-field emissions 170, or may cover different areas around the artificial barrier generator 100. In one embodiment, the keep out zone 182 is larger than the keep out zone 172. Optionally, the signals 150, 160, 170 may be emitted simultaneously, sequentially, or individually. When emitted simultaneously or sequentially, the signals 150, 160, 170 can effectively create one large keep out zone that encompasses zones 172 and 182. Thus, the user has the option of setting the size and/or location of the keep out zone for the artificial barrier generator 100, for example by selecting a setting where only the short-field keep out signals 170 are treated as keep out signals by the autonomous floor cleaner 10 or selecting the all keep out setting where the longer range signals 150, 160 are treated as keep out signals by the autonomous floor cleaner 10.

In FIG. 17, the artificial barrier generator 100 is positioned against a wall 196 of a room, and the signals 150, 160 overlap to create a wide, continuous keep out zone 182 that the autonomous floor cleaner 10 will not enter. Thus, the all keep out setting may be useful for keeping the autonomous floor cleaner 10 from going into a wider area of a room that contains items to be avoided, or to keep the cleaner 10 off a rug or a section of carpet.

Figure 18:
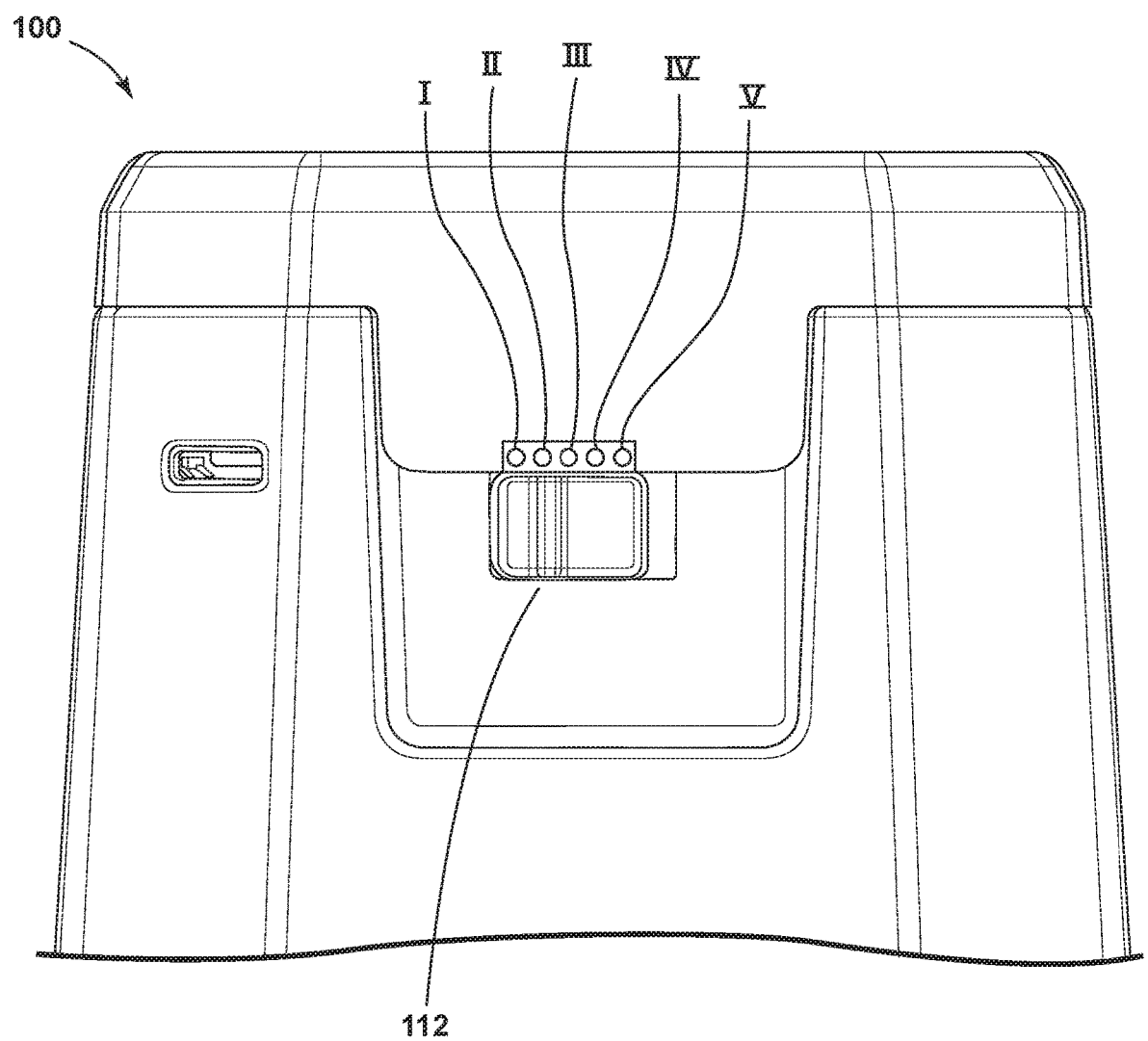
FIG. 18 is a partial front view of an artificial barrier device according to another embodiment.

FIG. 18 illustrates another embodiment of the artificial barrier generator 100. The artificial barrier generator 100 of FIG. 18 can be substantially identical to the artificial barrier generator 100 described above with respect to FIGS. 3-13B, save for having additional settings. In the methods described with respect to FIGS. 14-17, the coded signals 150, 160 emitted by the artificial barrier generator 100 can be the same for each setting of the autonomous floor cleaner 10; the floor cleaner 10 can simply react differently to the signals 150, 160 depending on the setting. In the embodiment of FIG. 18, the artificial barrier generator 100 can comprise different user-selectable modes or settings for interaction with autonomous floor cleaner 10. Depending on the setting, the artificial barrier generator 100 can emit different signals.

In one embodiment, the artificial barrier generator 100 can have an "off" setting and multiple "on" settings, such as a barrier setting, a first keep out setting, a second keep out setting, a third keep out setting, or any combination thereof. In the "off" setting, the transmitters 124, 126, 134-140 (FIG. 7) can be inactive. In the "on" settings, at least one of the infrared transmitters 124, 126 can be active. The "on" settings may include the transmitters 124, 126 being active in a wake mode of the generator 100, as described previously.

In any of the "on" settings, in addition to at least one of the transmitters 124, 126, the artificial barrier generator 100 can activate any other peripheral features useful for a cycle of operation including, but not limited to, illuminating the status light, energizing the infrared transmitters 134-140 for generating the short-field emissions 170, and/or polling for a Wi-Fi signal indicative of activity of the autonomous floor cleaner 10.

A user can select one of the settings via the switch 112. As shown in FIG. 18, the switch 112 can have a first position I corresponding to the "off" setting, a second position II corresponding to the barrier setting, a third position III corresponding to the first keep out setting, a fourth position IV corresponding to the second keep out setting, and a fifth position V corresponding to the third keep out setting. In another embodiment, a user can select one of the settings via a smartphone, tablet, or other remote device.

In the barrier setting, the generator 100 can emit the partially overlapping encoded infrared emissions 150, 160, and the overlapping emission pattern or barrier zone 180 creates a virtual partition that the autonomous floor cleaner 10 will not cross (e.g. FIG. 9).

Figure 19:
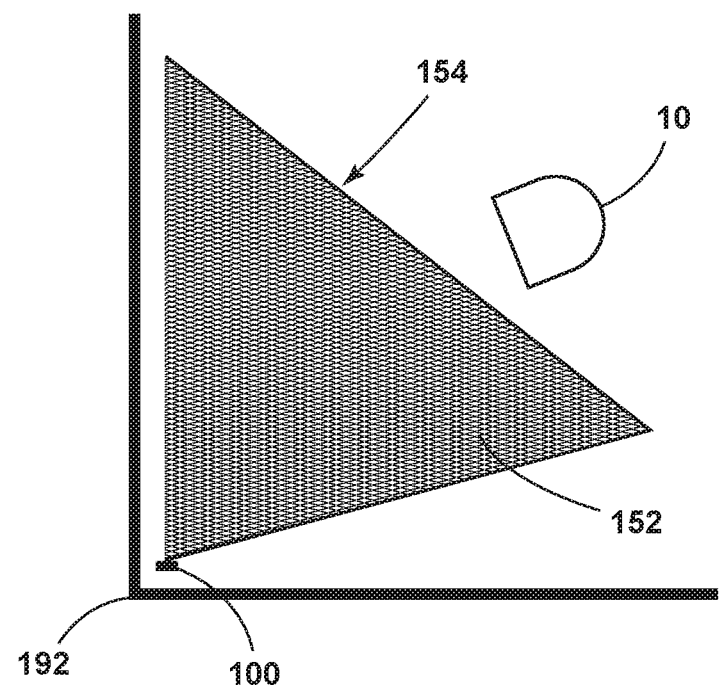
FIG. 19 is a schematic view depicting a method of containing an autonomous floor cleaner within a user-determined boundary, showing the artificial barrier device of FIG. 18 in an environment projecting a first keep out signal to create a first keep out zone.

In the first keep out setting, the left-side transmitter 124 can be activated for generating an encoded infrared emission or first keep out signal 152 (e.g. FIG. 19). Further, in the first keep out setting, the right-side transmitter 126 may not be activated and may not transmit any emission or signal. Alternatively, the right-side transmitter 126 can transmit the same encoded infrared emission 160 as in the barrier setting, and the autonomous floor cleaner 10 will not react to it as a keep out signal.

Figure 20:
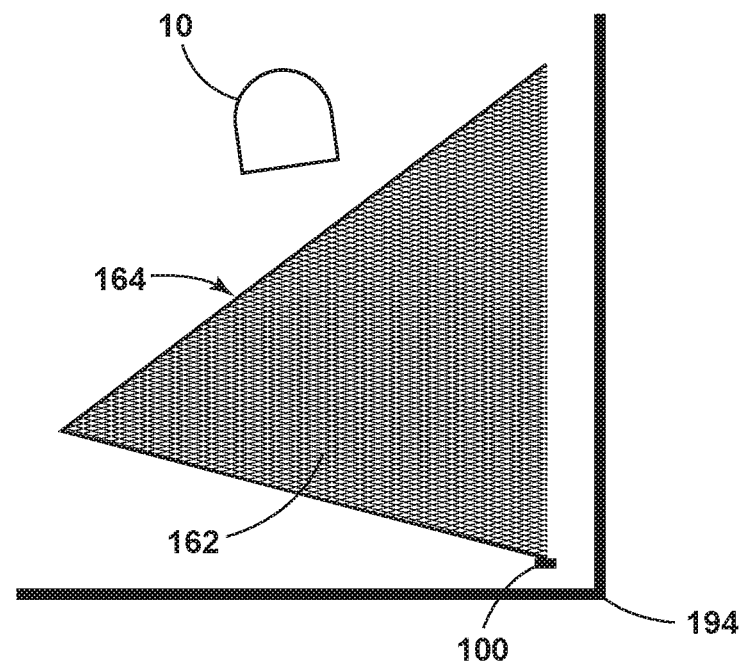
FIG. 20 is a schematic view depicting a method of containing an autonomous floor cleaner within a user-determined boundary, showing the artificial barrier device of FIG. 18 in an environment projecting a second keep out signal to create a second keep out zone.

In the second keep out setting, the right-side transmitter 126 can be activated for generating an encoded infrared emission or second keep out signal 162 (e.g. FIG. 20). Further, in the second keep out setting, the left-side transmitter 124 may not be activated and may not transmit any emission or signal. Alternatively, the left-side transmitter 124 can transmit the same encoded infrared emission 150 as in the barrier setting, and the autonomous floor cleaner 10 will not react to it as a keep out signal.

Figure 21:
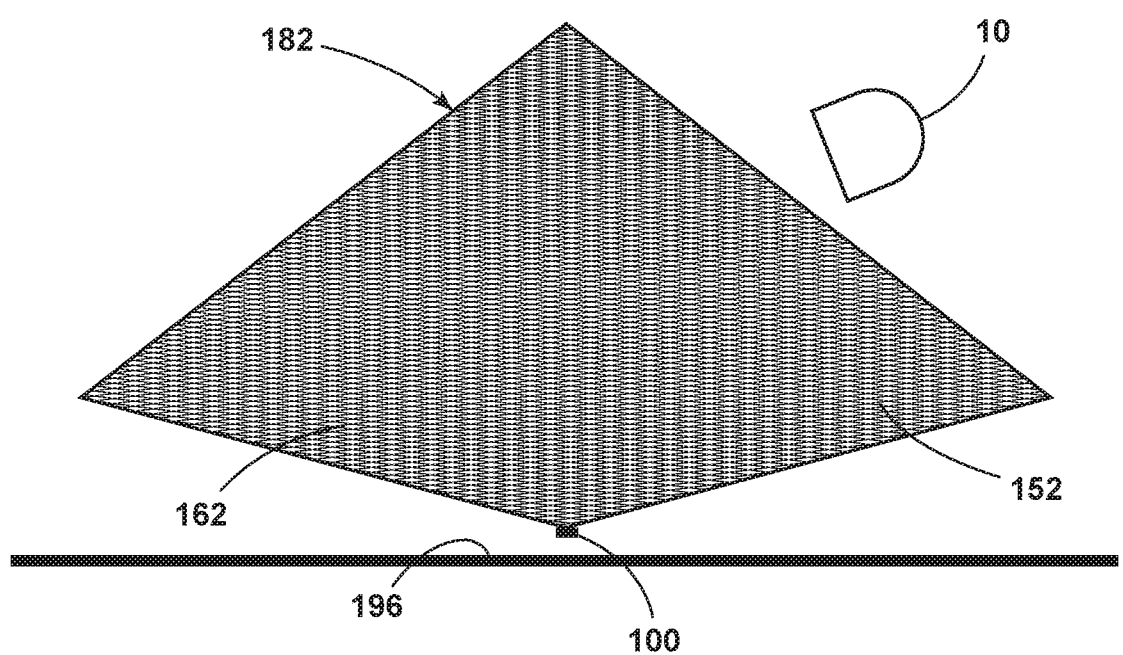
FIG. 21 is a schematic view depicting a method of containing an autonomous floor cleaner within a user-determined boundary, showing the artificial barrier device of FIG.

In the third keep out setting, also referred to herein as an all keep out setting, both transmitters 124, 126 can be activated for generating the keep out signals 152, 162 (e.g. FIG. 21). The keep out signals 152, 162 can partially overlap, creating a wider, continuous keep out zone 182.

The infrared emissions from the transmitters 124, 126 can be coded differently depending on the setting selected by the user. For example, the first keep out signal 162 can be coded differently than the first infrared emission 160, with both being transmitted by the left-side transmitter 124 in different settings, such that the autonomous floor cleaner 10 can detect and distinguish between the emissions. Similarly, the second keep out signal 152 can be coded differently than the first infrared emission 150, with both being transmitted by the right-side transmitter 126 in different settings, such that the autonomous floor cleaner 10 can detect and distinguish between the emissions.

There are several advantages of the present disclosure arising from the various features of the apparatuses described herein. For example, the embodiments of the invention described above provides a long-range artificial barrier for an autonomous floor cleaner with two infrared LED's that are not axially aligned, thereby easing manufacturing tolerances. Similarly, the LED's emit broad, diffuse patterns that similarly ease engineering requirements both for the autonomous floor cleaner with respect to processing power and speed and the artificial barrier generator itself. In this way, the artificial barrier generator transmits a narrow, long-range infrared barrier without incurring onerous engineering requirements or necessitating cost-prohibitive high-power optical elements.

Another advantage of some embodiments of the present disclosure is that the artificial barrier generator leverages multiple technologies to provide efficient energy usage for long, unattended run-time. The integration of USB charging and power, sleep mode and Wi-Fi wake-up provides users with energy efficiency via widely adopted technology already present in most homes.

While various embodiments illustrated herein show an autonomous or robotic vacuum cleaner, aspects of the invention such as the artificial barrier generator may be used on other types autonomous floor cleaners having liquid supply and extraction systems.

To the extent not already described, the different features and structures of the various embodiments disclosed herein may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A method of containing an autonomous floor cleaner within a user-determined boundary, comprising:
   providing an artificial barrier generator comprising a plurality of infrared transmitters;
   emitting a first signal from a first one of the plurality of infrared transmitters;
   emitting a second signal from a second one of the plurality of infrared transmitters, the second signal partially overlapping the first signal to create a barrier zone in which both the first and second signals can be detected by the autonomous floor cleaner;
   detecting the barrier zone with a receiver of the autonomous floor cleaner; and
   altering the course of the autonomous floor cleaner to avoid crossing through the barrier zone.

2. The method of claim 1, wherein the first and second signals are emitted sequentially.

3. The method of claim 1, wherein the first and second signals are emitted simultaneously.

4. The method of claim 1, wherein detecting the barrier zone with a receiver of the autonomous floor cleaner comprises receiving, with the receiver, the first signal and the second signal, and determining that the autonomous floor cleaner is in the barrier zone based on the received first and second signals.

5. The method of claim 1, comprising receiving, with a receiver of the artificial barrier generator, a signal from the autonomous floor cleaner.

6. The method of claim 5, wherein:
   the receiver of the artificial barrier generator is a sonic receiver comprising a microphone; and
   receiving the signal from the autonomous floor cleaner comprises sensing, with the microphone, a predetermined threshold sound level emitted by the autonomous floor cleaner, wherein the predetermined threshold sound level is indicative of the autonomous floor cleaner being within a predetermined distance from the artificial barrier generator.

7. The method of claim 5, wherein:
   the receiver of the artificial barrier generator is a radio frequency receiver comprising a Wi-Fi antenna and a Wi-Fi chip; and
   receiving the signal from the autonomous floor cleaner comprises detecting, with the radio frequency receiver, a radio frequency signal that is broadcast by the autonomous floor cleaner.

8. The method of claim 1, comprising:
   emitting a keep out signal from a third one of the plurality of infrared transmitters;
   detecting the keep out signal with the receiver of the autonomous floor cleaner; and
   altering the course of the autonomous floor cleaner based on the detection of the keep out signal.

9. The method of claim 8, wherein the keep out signal has a shorter range than the first and second signals.

10. The method of claim 1, comprising scanning for a signal from the autonomous floor cleaner receivable by a receiver of the artificial barrier generator.

11. The method of claim 10, comprising entering a sleep mode in which the artificial barrier generator does not emit the first or second signal if no signal from the autonomous floor cleaner is received by the receiver of the artificial barrier generator.

12. The method of claim 10, comprising:
   determining whether a scan time threshold is met;
   rescanning for a signal from the autonomous floor cleaner if the scan time threshold is met; and
   entering a sleep mode in which the artificial barrier generator does not emit the first or second signal if the scan time threshold is met and no signal from the autonomous floor cleaner is received by the receiver of the artificial barrier generator.

13. The method of claim 10, comprising:
   receiving, with the receiver of the artificial barrier generator, a signal from the autonomous floor cleaner; and
   determining if a residual power level of a battery of the artificial barrier generator is below a threshold value.

14. The method of claim 1, wherein the barrier zone is defined by a first outer edge and a second outer edge, the first and second outer edges being approximately orthogonal to a front of the artificial barrier generator.

15. An artificial barrier generator for containing an autonomous floor cleaner within a user-determined boundary, the artificial barrier generator comprising:
- a housing having a bottom configured to stand upon a floor surface to be cleaned by an autonomous floor cleaner;
- a first infrared transmitter within the housing configured to emit a first signal outwardly from the housing and across the floor surface for detection by an autonomous floor cleaner; and
- a second infrared transmitter within the housing configured to emit a second signal outwardly from the housing and across the floor surface for detection by an autonomous floor cleaner;
- wherein the first and second infrared transmitters partially overlap the emitted first and second signals to create a barrier zone in which both the first and second signals can be detected by an autonomous floor cleaner, whereby the autonomous floor cleaner alters course to avoid crossing through the barrier zone.

16. The artificial barrier generator of claim 15, wherein the barrier zone is defined by a first outer edge and a second outer edge, the first and second outer edges being approximately orthogonal to a front of the artificial barrier generator, and the barrier zone extending substantially straight out from the front of the artificial barrier generator across the floor surface.

17. The artificial barrier generator of claim 16, wherein the barrier zone has barrier zone width defined between the first and second outer edges, the barrier zone width being less than a distance between a first receiver and a second receiver of the autonomous floor cleaner.

18. The artificial barrier generator of claim 15, comprising:
- a first gasket surrounding the first infrared transmitter and defining a first aperture with a first outer edge in axial alignment with a center of the first infrared transmitter; and
- a second gasket surrounding the second infrared transmitter and defining a second aperture with a second outer edge in axial alignment with a center of the second infrared transmitter;
- wherein the first and second outer edges of the respective first and second apertures define the barrier zone.

19. The artificial barrier generator of claim 15, comprising:
- a third infrared transmitter within the housing configured to emit a keep out signal for detection by an autonomous floor cleaner, wherein the keep out signal has a shorter range than the first and second signals.

* * * * *